(12) United States Patent
High et al.

(10) Patent No.: US 10,017,322 B2
(45) Date of Patent: Jul. 10, 2018

(54) SYSTEMS AND METHODS FOR MOVING PALLETS VIA UNMANNED MOTORIZED UNIT-GUIDED FORKLIFTS

(71) Applicant: Wal-Mart Stores, Inc., Bentonville, AR (US)

(72) Inventors: Donald R. High, Noel, MO (US); Michael D. Atchley, Springdale, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 15/471,278

(22) Filed: Mar. 28, 2017

(65) Prior Publication Data

US 2017/0283171 A1   Oct. 5, 2017

Related U.S. Application Data

(60) Provisional application No. 62/316,782, filed on Apr. 1, 2016.

(51) Int. Cl.
| | |
|---|---|
| *B66F 9/06* | (2006.01) |
| *B65G 1/04* | (2006.01) |
| *B66F 9/075* | (2006.01) |

(52) U.S. Cl.
CPC ............ *B65G 1/0492* (2013.01); *B66F 9/063* (2013.01); *B66F 9/0755* (2013.01); *B66F 9/07581* (2013.01)

(58) Field of Classification Search
CPC ..................................................... B66F 9/063
See application file for complete search history.

(56) References Cited

U.S. PATENT DOCUMENTS

| | | | |
|---|---|---|---|
| 1,774,653 | A | 9/1930 | Marriott |
| 2,669,345 | A | 2/1954 | Brown |
| 3,765,546 | A | 10/1973 | Westerling |

(Continued)

FOREIGN PATENT DOCUMENTS

| | | |
|---|---|---|
| CA | 2524037 | 5/2006 |
| CA | 2625885 | 4/2007 |

(Continued)

OTHER PUBLICATIONS

GB; App. No. GB1704858.0; Combined Search and Examination Report dated Sep. 21, 2017.

(Continued)

*Primary Examiner* — Thomas Randazzo
(74) *Attorney, Agent, or Firm* — Fitch, Even, Tabin & Flannery LLP

(57) ABSTRACT

In some embodiments, methods and systems of facilitating movement of product-containing pallets include at least one forklift unit configured to lift and move the product-containing pallets, at least one motorized transport unit configured to mechanically engage and disengage a respective forklift unit, and a central computer system in communication with the at least one motorized transport unit. The central computer system is configured to transmit at least one signal to the at least one motorized transport unit. The signal is configured to cause the at least one motorized transport unit to control the at least one forklift unit to move at least one of the product-containing pallets.

20 Claims, 6 Drawing Sheets

(56) References Cited

U.S. PATENT DOCUMENTS

| | | |
|---|---|---|
| 4,071,740 A | 1/1978 | Gogulski |
| 4,158,416 A | 6/1979 | Podesta |
| 4,588,349 A | 5/1986 | Reuter |
| 4,672,280 A | 6/1987 | Honjo |
| 4,777,416 A | 10/1988 | Georgell |
| 4,791,482 A | 12/1988 | Barry |
| 4,868,544 A | 9/1989 | Havens |
| 4,911,608 A | 3/1990 | Krappitz |
| 5,119,087 A | 6/1992 | Lucas |
| 5,279,672 A | 1/1994 | Betker |
| 5,287,266 A | 2/1994 | Malec |
| 5,295,551 A | 3/1994 | Sukonick |
| 5,363,305 A | 11/1994 | Cox |
| 5,380,138 A | 1/1995 | Kasai |
| 5,384,450 A | 1/1995 | Goetz, Jr. |
| 5,395,206 A | 3/1995 | Cerny, Jr. |
| 5,402,051 A | 3/1995 | Fujiwara |
| 5,548,515 A | 8/1996 | Pilley |
| 5,632,381 A | 5/1997 | Thust |
| 5,652,489 A | 7/1997 | Kawakami |
| 5,671,362 A | 9/1997 | Cowe |
| 5,777,571 A | 7/1998 | Chuang |
| 5,801,340 A | 9/1998 | Peter |
| 5,917,174 A | 6/1999 | Moore |
| 5,920,261 A | 7/1999 | Hughes |
| 5,969,317 A | 10/1999 | Espy |
| 6,199,753 B1 | 3/2001 | Tracy |
| 6,201,203 B1 | 3/2001 | Tilles |
| 6,240,342 B1 | 5/2001 | Fiegert |
| 6,339,735 B1 | 1/2002 | Peless |
| 6,365,857 B1 | 4/2002 | Maehata |
| 6,374,155 B1 | 4/2002 | Wallach |
| 6,394,519 B1 | 5/2002 | Byers |
| 6,431,078 B2 | 8/2002 | Serrano |
| 6,522,952 B1 | 2/2003 | Arai |
| 6,525,509 B1 | 2/2003 | Petersson |
| 6,535,793 B2 | 3/2003 | Allard |
| 6,550,672 B1 | 4/2003 | Tracy |
| 6,571,693 B1 | 6/2003 | Kaldenberg |
| 6,584,375 B2 | 6/2003 | Bancroft |
| 6,584,376 B1 | 6/2003 | VanKommer |
| 6,600,418 B2 | 7/2003 | Francis |
| 6,626,632 B2 | 9/2003 | Guenzi |
| 6,633,800 B1 | 10/2003 | Ward |
| 6,655,897 B1 | 12/2003 | Harwell |
| 6,667,592 B2 | 12/2003 | Jacobs |
| 6,672,601 B1 | 1/2004 | Hofheins |
| 6,678,583 B2 | 1/2004 | Nasr |
| 6,688,435 B1 | 2/2004 | Will |
| 6,728,597 B2 | 4/2004 | Didriksen |
| 6,731,204 B2 | 5/2004 | Lehmann |
| 6,752,582 B2 | 6/2004 | Garcia |
| 6,816,085 B1 | 11/2004 | Haynes |
| 6,832,884 B2 | 12/2004 | Robinson |
| 6,841,963 B2 | 1/2005 | Song |
| 6,883,201 B2 | 4/2005 | Jones |
| 6,885,736 B2 | 4/2005 | Uppaluru |
| 6,895,301 B2 | 5/2005 | Mountz |
| 6,910,828 B1 | 6/2005 | Hughes |
| 6,954,695 B2 | 10/2005 | Bonilla |
| 6,967,455 B2 | 11/2005 | Nakadai |
| 6,975,997 B1 | 12/2005 | Murakami |
| 7,039,499 B1 | 5/2006 | Nasr |
| 7,066,291 B2 | 6/2006 | Martins |
| 7,101,113 B2 | 9/2006 | Hughes |
| 7,117,902 B2 | 10/2006 | Osborne |
| 7,145,562 B2 | 12/2006 | Schechter |
| 7,147,154 B2 | 12/2006 | Myers |
| 7,184,586 B2 | 2/2007 | Jeon |
| 7,205,016 B2 | 4/2007 | Garwood |
| 7,206,753 B2 | 4/2007 | Bancroft |
| 7,233,241 B2 | 6/2007 | Overhultz |
| 7,234,609 B2 | 6/2007 | DeLazzer |
| 7,261,511 B2 | 8/2007 | Felder |
| 7,367,245 B2 | 5/2008 | Okazaki |
| 7,381,022 B1 | 6/2008 | King |
| 7,402,018 B2 | 7/2008 | Mountz |
| 7,447,564 B2 | 11/2008 | Yasukawa |
| 7,463,147 B1 | 12/2008 | Laffoon |
| 7,474,945 B2 | 1/2009 | Matsunaga |
| 7,487,913 B2 | 2/2009 | Adema |
| 7,533,029 B2 | 5/2009 | Mallett |
| 7,554,282 B2 | 6/2009 | Nakamoto |
| 7,556,108 B2 | 7/2009 | Won |
| 7,556,219 B2 | 7/2009 | Page |
| 7,613,544 B2 | 11/2009 | Park |
| 7,627,515 B2 | 12/2009 | Borgs |
| 7,636,045 B2 | 12/2009 | Sugiyama |
| 7,648,068 B2 | 1/2010 | Silverbrook |
| 7,653,603 B1 | 1/2010 | Holtkamp, Jr. |
| 7,658,327 B2 | 2/2010 | Tuchman |
| 7,689,322 B2 | 3/2010 | Tanaka |
| 7,693,605 B2 | 4/2010 | Park |
| 7,693,745 B1 | 4/2010 | Pomerantz |
| 7,693,757 B2 | 4/2010 | Zimmerman |
| 7,706,917 B1 | 4/2010 | Chiappetta |
| 7,726,563 B2 | 6/2010 | Scott |
| 7,762,458 B2 | 7/2010 | Stawar |
| 7,783,527 B2 | 8/2010 | Bonner |
| 7,817,394 B2 | 10/2010 | Mukherjee |
| 7,826,919 B2 | 11/2010 | DAndrea |
| 7,835,281 B2 | 11/2010 | Lee |
| 7,894,939 B2 | 2/2011 | Zini |
| 7,969,297 B2 | 6/2011 | Haartsen |
| 7,996,109 B2 | 8/2011 | Zini |
| 8,010,230 B2 | 8/2011 | Zini |
| 8,032,249 B1 | 10/2011 | Shakes |
| 8,041,455 B2 | 10/2011 | Thorne |
| 8,050,976 B2 | 11/2011 | Staib |
| 8,065,032 B2 | 11/2011 | Stifter |
| 8,065,353 B2 | 11/2011 | Eckhoff-Hornback |
| 8,083,013 B2 | 12/2011 | Bewley |
| 8,099,191 B2 | 1/2012 | Blanc |
| 8,103,398 B2 | 1/2012 | Duggan |
| 8,195,333 B2 | 6/2012 | Ziegler |
| 8,239,276 B2 | 8/2012 | Lin |
| 8,244,041 B1 | 8/2012 | Silver |
| 8,248,467 B1 | 8/2012 | Ganick |
| 8,260,456 B2 | 9/2012 | Siegel |
| 8,284,240 B2 | 10/2012 | Saint-Pierre |
| 8,295,542 B2 | 10/2012 | Albertson |
| 8,321,303 B1 | 11/2012 | Krishnamurthy |
| 8,325,036 B1 | 12/2012 | Fuhr |
| 8,342,467 B2 | 1/2013 | Stachowski |
| 8,352,110 B1 | 1/2013 | Szybalski |
| 8,359,122 B2 | 1/2013 | Koselka |
| 8,380,349 B1 | 2/2013 | Hickman |
| 8,393,846 B1 | 3/2013 | Coots |
| 8,412,400 B2 | 4/2013 | DAndrea |
| 8,423,280 B2 | 4/2013 | Edwards |
| 8,425,173 B2 | 4/2013 | Lert |
| 8,429,004 B2 | 4/2013 | Hamilton |
| 8,430,192 B2 | 4/2013 | Gillett |
| 8,433,470 B1 | 4/2013 | Szybalski |
| 8,433,507 B2 | 4/2013 | Hannah |
| 8,437,875 B2 | 5/2013 | Hernandez |
| 8,444,369 B2 | 5/2013 | Watt |
| 8,447,863 B1 | 5/2013 | Francis, Jr. |
| 8,452,450 B2 | 5/2013 | Dooley |
| 8,474,090 B2 | 7/2013 | Jones |
| 8,494,908 B2 | 7/2013 | Herwig |
| 8,504,202 B2 | 8/2013 | Ichinose |
| 8,508,590 B2 | 8/2013 | Laws |
| 8,510,033 B2 | 8/2013 | Park |
| 8,511,606 B1 | 8/2013 | Lutke |
| 8,515,580 B2 | 8/2013 | Taylor |
| 8,516,651 B2 | 8/2013 | Jones |
| 8,538,577 B2 | 9/2013 | Bell |
| 8,544,858 B2 | 10/2013 | Eberlein |
| 8,571,700 B2 | 10/2013 | Keller |
| 8,577,538 B2 | 11/2013 | Lenser |
| 8,587,662 B1 | 11/2013 | Moll |
| 8,594,834 B1 | 11/2013 | Clark |
| 8,606,314 B2 | 12/2013 | Barnes, Jr. |

(56) References Cited

U.S. PATENT DOCUMENTS

| | | | | |
|---|---|---|---|---|
| 8,606,392 | B2 | 12/2013 | Wurman | |
| 8,639,382 | B1 | 1/2014 | Clark | |
| 8,645,223 | B2 | 2/2014 | Ouimet | |
| 8,649,557 | B2 | 2/2014 | Hyung | |
| 8,656,550 | B2 | 2/2014 | Jones | |
| 8,670,866 | B2 | 3/2014 | Ziegler | |
| 8,671,507 | B2 | 3/2014 | Jones | |
| 8,676,377 | B2 | 3/2014 | Siegel | |
| 8,676,420 | B2 | 3/2014 | Kume | |
| 8,676,480 | B2 | 3/2014 | Lynch | |
| 8,700,230 | B1 | 4/2014 | Hannah | |
| 8,708,285 | B1 | 4/2014 | Carreiro | |
| 8,718,814 | B1 | 5/2014 | Clark | |
| 8,724,282 | B2 | 5/2014 | Hiremath | |
| 8,732,039 | B1 | 5/2014 | Chen | |
| 8,744,626 | B2 | 6/2014 | Johnson | |
| 8,763,199 | B2 | 7/2014 | Jones | |
| 8,770,976 | B2 | 7/2014 | Moser | |
| 8,775,064 | B2 | 7/2014 | Zeng | |
| 8,798,786 | B2 | 8/2014 | Wurman | |
| 8,798,840 | B2 | 8/2014 | Fong | |
| 8,818,556 | B2 | 8/2014 | Sanchez | |
| 8,825,226 | B1 | 9/2014 | Worley, III | |
| 8,831,984 | B2 | 9/2014 | Hoffman | |
| 8,838,268 | B2 | 9/2014 | Friedman | |
| 8,843,244 | B2 | 9/2014 | Phillips | |
| 8,882,432 | B2 | 11/2014 | Bastian, II | |
| 8,886,390 | B2 | 11/2014 | Wolfe | |
| 8,892,240 | B1 | 11/2014 | Vliet | |
| 8,892,241 | B2 | 11/2014 | Weiss | |
| 8,918,202 | B2 | 12/2014 | Kawano | |
| 8,918,230 | B2 | 12/2014 | Chen | |
| 8,930,044 | B1 | 1/2015 | Peeters | |
| 8,965,561 | B2 * | 2/2015 | Jacobus | G06Q 10/087 700/214 |
| 8,972,045 | B1 | 3/2015 | Mountz | |
| 8,972,061 | B2 | 3/2015 | Rosenstein | |
| 8,983,647 | B1 | 3/2015 | Dwarakanath | |
| 8,989,053 | B1 | 3/2015 | Skaaksrud | |
| 9,008,829 | B2 | 4/2015 | Worsley | |
| 9,014,848 | B2 | 4/2015 | Farlow | |
| 9,075,136 | B1 | 7/2015 | Joao | |
| 9,129,277 | B2 | 9/2015 | MacIntosh | |
| 9,170,117 | B1 | 10/2015 | Abuelsaad | |
| 9,173,816 | B2 | 11/2015 | Reinhardt | |
| 9,190,304 | B2 | 11/2015 | MacKnight | |
| 1,506,095 | A1 | 3/2016 | High | |
| 1,506,102 | A1 | 3/2016 | High | |
| 1,506,105 | A1 | 3/2016 | Kay | |
| 1,506,120 | A1 | 3/2016 | High | |
| 1,506,126 | A1 | 3/2016 | High | |
| 1,506,128 | A1 | 3/2016 | High | |
| 1,506,132 | A1 | 3/2016 | High | |
| 1,506,135 | A1 | 3/2016 | Thompson | |
| 1,506,140 | A1 | 3/2016 | High | |
| 1,506,147 | A1 | 3/2016 | High | |
| 1,506,150 | A1 | 3/2016 | High | |
| 1,506,167 | A1 | 3/2016 | High | |
| 1,506,168 | A1 | 3/2016 | High | |
| 1,506,172 | A1 | 3/2016 | High | |
| 1,506,177 | A1 | 3/2016 | Atchley | |
| 1,506,179 | A1 | 3/2016 | Winkle | |
| 1,506,180 | A1 | 3/2016 | High | |
| 1,506,184 | A1 | 3/2016 | High | |
| 1,506,190 | A1 | 3/2016 | High | |
| 1,506,198 | A1 | 3/2016 | Thompson | |
| 9,278,839 | B2 * | 3/2016 | Gilbride | B62B 5/0069 |
| 9,305,280 | B1 | 4/2016 | Berg | |
| 9,495,703 | B1 | 11/2016 | Kaye, III | |
| 9,534,906 | B2 | 1/2017 | High | |
| 9,550,577 | B1 | 1/2017 | Beckman | |
| 9,573,684 | B2 | 2/2017 | Kimchi | |
| 9,578,282 | B1 | 2/2017 | Sills | |
| 9,607,285 | B1 | 3/2017 | Wellman | |
| 9,623,923 | B2 * | 4/2017 | Riedel | B66F 9/063 |
| 9,649,766 | B2 | 5/2017 | Stubbs | |
| 9,658,622 | B2 * | 5/2017 | Walton | G05D 1/0212 |
| 9,663,292 | B1 | 5/2017 | Brazeau | |
| 9,663,293 | B2 | 5/2017 | Wurman | |
| 9,663,295 | B1 | 5/2017 | Wurman | |
| 9,663,296 | B1 | 5/2017 | Dingle | |
| 9,747,480 | B2 | 8/2017 | McAllister | |
| 9,757,002 | B2 | 9/2017 | Thompson | |
| 9,801,517 | B2 | 10/2017 | High | |
| 9,875,502 | B2 | 1/2018 | Kay | |
| 9,875,503 | B2 | 1/2018 | High | |
| 9,896,315 | B2 | 3/2018 | High | |
| 2001/0042024 | A1 | 11/2001 | Rogers | |
| 2002/0060542 | A1 | 5/2002 | Song | |
| 2002/0095342 | A1 | 7/2002 | Feldman | |
| 2002/0154974 | A1 | 10/2002 | Fukuda | |
| 2002/0156551 | A1 | 10/2002 | Tackett | |
| 2002/0165638 | A1 | 11/2002 | Bancroft | |
| 2002/0165643 | A1 | 11/2002 | Bancroft | |
| 2002/0165790 | A1 | 11/2002 | Bancroft | |
| 2002/0174021 | A1 | 11/2002 | Chu | |
| 2003/0028284 | A1 | 2/2003 | Chirnomas | |
| 2003/0152679 | A1 | 8/2003 | Garwood | |
| 2003/0170357 | A1 | 9/2003 | Garwood | |
| 2003/0185948 | A1 | 10/2003 | Garwood | |
| 2003/0222798 | A1 | 12/2003 | Floros | |
| 2004/0068348 | A1 | 4/2004 | Jager | |
| 2004/0081729 | A1 | 4/2004 | Garwood | |
| 2004/0093650 | A1 | 5/2004 | Martins | |
| 2004/0098167 | A1 | 5/2004 | Yi | |
| 2004/0117063 | A1 | 6/2004 | Sabe | |
| 2004/0146602 | A1 | 7/2004 | Garwood | |
| 2004/0216339 | A1 | 11/2004 | Garberg | |
| 2004/0217166 | A1 | 11/2004 | Myers | |
| 2004/0221790 | A1 | 11/2004 | Sinclair | |
| 2004/0249497 | A1 | 12/2004 | Saigh | |
| 2005/0008463 | A1 | 1/2005 | Stehr | |
| 2005/0047895 | A1 | 3/2005 | Lert | |
| 2005/0072651 | A1 | 4/2005 | Wieth | |
| 2005/0080520 | A1 | 4/2005 | Kline | |
| 2005/0104547 | A1 | 5/2005 | Wang | |
| 2005/0149414 | A1 | 7/2005 | Schrodt | |
| 2005/0177446 | A1 | 8/2005 | Hoblit | |
| 2005/0216126 | A1 | 9/2005 | Koselka | |
| 2005/0230472 | A1 | 10/2005 | Chang | |
| 2005/0238465 | A1 | 10/2005 | Razumov | |
| 2006/0107067 | A1 | 5/2006 | Safal | |
| 2006/0147087 | A1 | 7/2006 | Goncalves | |
| 2006/0163350 | A1 | 7/2006 | Melton | |
| 2006/0178777 | A1 | 8/2006 | Park | |
| 2006/0206235 | A1 | 9/2006 | Shakes | |
| 2006/0220809 | A1 | 10/2006 | Stigall | |
| 2006/0221072 | A1 | 10/2006 | Se | |
| 2006/0231301 | A1 * | 10/2006 | Rose | B62B 3/0612 180/19.1 |
| 2006/0235570 | A1 | 10/2006 | Jung | |
| 2006/0241827 | A1 | 10/2006 | Fukuchi | |
| 2006/0244588 | A1 | 11/2006 | Hannah | |
| 2006/0279421 | A1 | 12/2006 | French | |
| 2006/0293810 | A1 | 12/2006 | Nakamoto | |
| 2007/0005179 | A1 | 1/2007 | Mccrackin | |
| 2007/0017855 | A1 | 1/2007 | Pippin | |
| 2007/0045018 | A1 | 3/2007 | Carter | |
| 2007/0061210 | A1 | 3/2007 | Chen | |
| 2007/0085682 | A1 | 4/2007 | Murofushi | |
| 2007/0125727 | A1 | 6/2007 | Winkler | |
| 2007/0150368 | A1 | 6/2007 | Arora | |
| 2007/0152057 | A1 | 7/2007 | Cato | |
| 2007/0269299 | A1 * | 11/2007 | Ross | B60L 15/2036 414/347 |
| 2007/0284442 | A1 | 12/2007 | Herskovitz | |
| 2007/0288123 | A1 | 12/2007 | Raffaello | |
| 2007/0293978 | A1 | 12/2007 | Wurman | |
| 2008/0031491 | A1 | 2/2008 | Ma | |
| 2008/0041644 | A1 | 2/2008 | Tudek | |
| 2008/0075566 | A1 | 3/2008 | Benedict | |
| 2008/0075568 | A1 | 3/2008 | Benedict | |
| 2008/0075569 | A1 | 3/2008 | Benedict | |
| 2008/0077511 | A1 | 3/2008 | Zimmerman | |

(56) References Cited

U.S. PATENT DOCUMENTS

| | | |
|---|---|---|
| 2008/0105445 A1 | 5/2008 | Dayton |
| 2008/0131255 A1 | 6/2008 | Hessler |
| 2008/0140253 A1 | 6/2008 | Brown |
| 2008/0154720 A1 | 6/2008 | Gounares |
| 2008/0201227 A1 | 8/2008 | Bakewell |
| 2008/0226129 A1 | 9/2008 | Kundu |
| 2008/0267759 A1 | 10/2008 | Morency |
| 2008/0281515 A1 | 11/2008 | Ann |
| 2008/0281664 A1 | 11/2008 | Campbell |
| 2008/0294288 A1 | 11/2008 | Yamauchi |
| 2008/0306787 A1 | 12/2008 | Hamilton |
| 2008/0308630 A1 | 12/2008 | Bhogal |
| 2008/0314667 A1 | 12/2008 | Hannah |
| 2009/0074545 A1 | 3/2009 | Lert |
| 2009/0134572 A1 | 5/2009 | Obuchi |
| 2009/0138375 A1 | 5/2009 | Schwartz |
| 2009/0154708 A1 | 6/2009 | Kolar Sunder |
| 2009/0155033 A1 | 6/2009 | Olsen |
| 2009/0164902 A1 | 6/2009 | Cohen |
| 2009/0210536 A1 | 8/2009 | Allen |
| 2009/0240571 A1 | 9/2009 | Bonner |
| 2009/0259571 A1 | 10/2009 | Ebling |
| 2009/0269173 A1 | 10/2009 | De Leo |
| 2009/0299822 A1 | 12/2009 | Harari |
| 2009/0319399 A1 | 12/2009 | Resta |
| 2010/0025964 A1 | 2/2010 | Fisk |
| 2010/0030417 A1 | 2/2010 | Fang |
| 2010/0076959 A1 | 3/2010 | Ramani |
| 2010/0138281 A1 | 6/2010 | Zhang |
| 2010/0143089 A1 | 6/2010 | Hvass |
| 2010/0171826 A1 | 7/2010 | Hamilton |
| 2010/0176922 A1* | 7/2010 | Schwab ............ G06K 7/10356 340/10.1 |
| 2010/0211441 A1 | 8/2010 | Sprigg |
| 2010/0222925 A1 | 9/2010 | Anezaki |
| 2010/0268697 A1 | 10/2010 | Karlsson |
| 2010/0295847 A1 | 11/2010 | Titus |
| 2010/0299065 A1 | 11/2010 | Mays |
| 2010/0302102 A1 | 12/2010 | Desai |
| 2010/0324773 A1 | 12/2010 | Choi |
| 2011/0010023 A1 | 1/2011 | Kunzig |
| 2011/0022201 A1 | 1/2011 | Reumerman |
| 2011/0098920 A1 | 4/2011 | Chuang |
| 2011/0153081 A1 | 6/2011 | Romanov |
| 2011/0163160 A1 | 7/2011 | Zini |
| 2011/0176803 A1 | 7/2011 | Song |
| 2011/0225071 A1 | 9/2011 | Sano |
| 2011/0240777 A1 | 10/2011 | Johns |
| 2011/0258060 A1 | 10/2011 | Sweeney |
| 2011/0260865 A1 | 10/2011 | Bergman |
| 2011/0279252 A1 | 11/2011 | Carter |
| 2011/0288684 A1 | 11/2011 | Farlow |
| 2011/0288763 A1 | 11/2011 | Hui |
| 2011/0295424 A1 | 12/2011 | Johnson |
| 2011/0320034 A1 | 12/2011 | Dearlove |
| 2011/0320322 A1 | 12/2011 | Roslak |
| 2012/0000024 A1 | 1/2012 | Layton |
| 2012/0029697 A1 | 2/2012 | Ota |
| 2012/0035823 A1 | 2/2012 | Carter |
| 2012/0046998 A1 | 2/2012 | Staib |
| 2012/0059743 A1 | 3/2012 | Rao |
| 2012/0072303 A1 | 3/2012 | Brown |
| 2012/0134771 A1 | 5/2012 | Larson |
| 2012/0143726 A1 | 6/2012 | Chirnomas |
| 2012/0192260 A1 | 7/2012 | Kontsevich |
| 2012/0226556 A1 | 9/2012 | Itagaki |
| 2012/0239224 A1 | 9/2012 | McCabe |
| 2012/0255810 A1 | 10/2012 | Yang |
| 2012/0259732 A1 | 10/2012 | Sasankan |
| 2012/0272500 A1 | 11/2012 | Reuteler |
| 2012/0294698 A1 | 11/2012 | Villamar |
| 2012/0303263 A1 | 11/2012 | Alam |
| 2012/0303479 A1 | 11/2012 | Derks |
| 2012/0330458 A1 | 12/2012 | Weiss |
| 2013/0016011 A1 | 1/2013 | Harriman |
| 2013/0026224 A1 | 1/2013 | Ganick |
| 2013/0051667 A1 | 2/2013 | Deng |
| 2013/0054052 A1 | 2/2013 | Waltz |
| 2013/0054280 A1 | 2/2013 | Moshfeghi |
| 2013/0060461 A1 | 3/2013 | Wong |
| 2013/0073405 A1 | 3/2013 | Ariyibi |
| 2013/0096735 A1 | 4/2013 | Byford |
| 2013/0103539 A1 | 4/2013 | Abraham |
| 2013/0105036 A1 | 5/2013 | Smith |
| 2013/0110671 A1 | 5/2013 | Gray |
| 2013/0141555 A1 | 6/2013 | Ganick |
| 2013/0145572 A1 | 6/2013 | Schregardus |
| 2013/0151335 A1 | 6/2013 | Avadhanam |
| 2013/0155058 A1 | 6/2013 | Golparvar-Fard |
| 2013/0174371 A1 | 7/2013 | Jones |
| 2013/0181370 A1 | 7/2013 | Rafie |
| 2013/0211953 A1 | 8/2013 | Abraham |
| 2013/0235206 A1 | 9/2013 | Smith |
| 2013/0238130 A1 | 9/2013 | Dorschel |
| 2013/0276004 A1 | 10/2013 | Boncyk |
| 2013/0300729 A1 | 11/2013 | Grimaud |
| 2013/0302132 A1 | 11/2013 | DAndrea |
| 2013/0309637 A1 | 11/2013 | Minvielle |
| 2013/0317642 A1 | 11/2013 | Asaria |
| 2013/0333961 A1 | 12/2013 | ODonnell |
| 2013/0338825 A1 | 12/2013 | Cantor |
| 2014/0006229 A1 | 1/2014 | Birch |
| 2014/0014470 A1 | 1/2014 | Razumov |
| 2014/0032034 A1 | 1/2014 | Raptopoulos |
| 2014/0032379 A1 | 1/2014 | Schuetz |
| 2014/0037404 A1 | 2/2014 | Hancock |
| 2014/0046512 A1 | 2/2014 | Villamar |
| 2014/0058556 A1 | 2/2014 | Kawano |
| 2014/0067564 A1 | 3/2014 | Yuan |
| 2014/0081445 A1 | 3/2014 | Villamar |
| 2014/0091013 A1 | 4/2014 | Streufert |
| 2014/0100715 A1 | 4/2014 | Mountz |
| 2014/0100768 A1 | 4/2014 | Kessens |
| 2014/0100769 A1 | 4/2014 | Wurman |
| 2014/0100998 A1 | 4/2014 | Mountz |
| 2014/0100999 A1 | 4/2014 | Mountz |
| 2014/0101690 A1 | 4/2014 | Boncyk |
| 2014/0108087 A1 | 4/2014 | Fukui |
| 2014/0124004 A1 | 5/2014 | Rosenstein |
| 2014/0129054 A1 | 5/2014 | Huntzicker |
| 2014/0135984 A1 | 5/2014 | Hirata |
| 2014/0143039 A1 | 5/2014 | Branton |
| 2014/0149958 A1 | 5/2014 | Samadi |
| 2014/0152507 A1 | 6/2014 | McAllister |
| 2014/0156450 A1 | 6/2014 | Ruckart |
| 2014/0156461 A1 | 6/2014 | Lerner |
| 2014/0157156 A1 | 6/2014 | Kawamoto |
| 2014/0164123 A1 | 6/2014 | Wissner-Gross |
| 2014/0172197 A1 | 6/2014 | Ganz |
| 2014/0172727 A1 | 6/2014 | Abhyanker |
| 2014/0180478 A1 | 6/2014 | Letsky |
| 2014/0180528 A1 | 6/2014 | Argue |
| 2014/0180865 A1 | 6/2014 | Argue |
| 2014/0201041 A1 | 7/2014 | Meyer |
| 2014/0207614 A1 | 7/2014 | Ramaswamy |
| 2014/0209514 A1 | 7/2014 | Gitschel |
| 2014/0211988 A1 | 7/2014 | Fan |
| 2014/0214205 A1 | 7/2014 | Kwon |
| 2014/0217242 A1 | 8/2014 | Muren |
| 2014/0228999 A1 | 8/2014 | D'Andrea |
| 2014/0229320 A1 | 8/2014 | Mohammed |
| 2014/0244026 A1 | 8/2014 | Neiser |
| 2014/0244207 A1 | 8/2014 | Hicks |
| 2014/0246257 A1 | 9/2014 | Jacobsen |
| 2014/0247116 A1 | 9/2014 | Davidson |
| 2014/0250613 A1 | 9/2014 | Jones |
| 2014/0254896 A1 | 9/2014 | Zhou |
| 2014/0257928 A1 | 9/2014 | Chen |
| 2014/0266616 A1 | 9/2014 | Jones |
| 2014/0274309 A1 | 9/2014 | Nguyen |
| 2014/0277693 A1 | 9/2014 | Naylor |
| 2014/0277742 A1 | 9/2014 | Wells |
| 2014/0277841 A1 | 9/2014 | Klicpera |
| 2014/0285134 A1 | 9/2014 | Kim |

(56) References Cited

U.S. PATENT DOCUMENTS

| | | |
|---|---|---|
| 2014/0289009 A1 | 9/2014 | Campbell |
| 2014/0297090 A1 | 10/2014 | Ichinose |
| 2014/0304107 A1 | 10/2014 | McAllister |
| 2014/0306654 A1 | 10/2014 | Partovi |
| 2014/0309809 A1 | 10/2014 | Dixon |
| 2014/0330456 A1 | 11/2014 | LopezMorales |
| 2014/0330677 A1 | 11/2014 | Boncyk |
| 2014/0344118 A1 | 11/2014 | Parpia |
| 2014/0350725 A1 | 11/2014 | LaFary |
| 2014/0350851 A1 | 11/2014 | Carter |
| 2014/0350855 A1 | 11/2014 | Vishnuvajhala |
| 2014/0361077 A1 | 12/2014 | Davidson |
| 2014/0369558 A1 | 12/2014 | Holz |
| 2014/0371912 A1 | 12/2014 | Passot |
| 2014/0379588 A1 | 12/2014 | Gates |
| 2015/0029339 A1 | 1/2015 | Kobres |
| 2015/0032252 A1 | 1/2015 | Galluzzo |
| 2015/0045992 A1 | 2/2015 | Ashby |
| 2015/0046299 A1 | 2/2015 | Yan |
| 2015/0066283 A1 | 3/2015 | Wurman |
| 2015/0073589 A1 | 3/2015 | Khodl |
| 2015/0098775 A1 | 4/2015 | Razumov |
| 2015/0100439 A1 | 4/2015 | Lu |
| 2015/0100461 A1 | 4/2015 | Baryakar |
| 2015/0112826 A1 | 4/2015 | Crutchfield |
| 2015/0120094 A1 | 4/2015 | Kimchi |
| 2015/0123973 A1 | 5/2015 | Larsen |
| 2015/0142249 A1 | 5/2015 | Ooga |
| 2015/0203140 A1 | 7/2015 | Holtan |
| 2015/0205300 A1 | 7/2015 | Caver |
| 2015/0217449 A1 | 8/2015 | Meier |
| 2015/0217790 A1 | 8/2015 | Golden |
| 2015/0221854 A1 | 8/2015 | Melz |
| 2015/0229906 A1 | 8/2015 | Inacio De Matos |
| 2015/0231873 A1 | 8/2015 | Okamoto |
| 2015/0277440 A1 | 10/2015 | Kimchi |
| 2015/0278889 A1 | 10/2015 | Qian |
| 2015/0325128 A1 | 11/2015 | Lord |
| 2015/0336668 A1 | 11/2015 | Pasko |
| 2015/0360865 A1 | 12/2015 | Massey |
| 2016/0023675 A1 | 1/2016 | Hannah |
| 2016/0052139 A1 | 2/2016 | Hyde |
| 2016/0101794 A1* | 4/2016 | Fowler ................. B66F 9/18 254/2 R |
| 2016/0101936 A1 | 4/2016 | Chamberlin |
| 2016/0110701 A1 | 4/2016 | Herring |
| 2016/0114488 A1 | 4/2016 | Mascorro Medina |
| 2016/0167557 A1 | 6/2016 | Mecklinger |
| 2016/0167577 A1 | 6/2016 | Simmons |
| 2016/0176638 A1 | 6/2016 | Toebes |
| 2016/0196755 A1 | 7/2016 | Navot |
| 2016/0210602 A1 | 7/2016 | Siddique |
| 2016/0236867 A1 | 8/2016 | Brazeau |
| 2016/0255969 A1 | 9/2016 | High |
| 2016/0257212 A1 | 9/2016 | Thompson |
| 2016/0257240 A1 | 9/2016 | High |
| 2016/0257401 A1 | 9/2016 | Buchmueller |
| 2016/0258762 A1 | 9/2016 | Taylor |
| 2016/0258763 A1 | 9/2016 | High |
| 2016/0259028 A1 | 9/2016 | High |
| 2016/0259329 A1 | 9/2016 | High |
| 2016/0259331 A1 | 9/2016 | Thompson |
| 2016/0259339 A1 | 9/2016 | High |
| 2016/0259340 A1 | 9/2016 | Kay |
| 2016/0259341 A1 | 9/2016 | High |
| 2016/0259342 A1 | 9/2016 | High |
| 2016/0259343 A1 | 9/2016 | High |
| 2016/0259344 A1 | 9/2016 | High |
| 2016/0259345 A1 | 9/2016 | McHale |
| 2016/0259346 A1 | 9/2016 | High |
| 2016/0260049 A1 | 9/2016 | High |
| 2016/0260054 A1 | 9/2016 | High |
| 2016/0260055 A1 | 9/2016 | High |
| 2016/0260142 A1 | 9/2016 | Winkle |
| 2016/0260145 A1 | 9/2016 | High |
| 2016/0260148 A1 | 9/2016 | High |
| 2016/0260158 A1 | 9/2016 | High |
| 2016/0260159 A1 | 9/2016 | Atchley |
| 2016/0260161 A1 | 9/2016 | Atchley |
| 2016/0261698 A1 | 9/2016 | Thompson |
| 2016/0274586 A1 | 9/2016 | Stubbs |
| 2016/0288601 A1 | 10/2016 | Gehrke |
| 2016/0300291 A1 | 10/2016 | Carmeli |
| 2016/0301698 A1 | 10/2016 | Katara |
| 2016/0325932 A1 | 11/2016 | Hognaland |
| 2016/0349754 A1* | 12/2016 | Mohr ................. G05D 1/0088 |
| 2016/0355337 A1 | 12/2016 | Lert |
| 2016/0364785 A1 | 12/2016 | Wankhede |
| 2016/0364786 A1 | 12/2016 | Wankhede |
| 2017/0009417 A1 | 1/2017 | High |
| 2017/0010608 A1 | 1/2017 | High |
| 2017/0010609 A1 | 1/2017 | High |
| 2017/0010610 A1 | 1/2017 | Atchley |
| 2017/0020354 A1 | 1/2017 | High |
| 2017/0024806 A1 | 1/2017 | High |
| 2017/0080846 A1* | 3/2017 | Lord ................. B66F 9/063 |
| 2017/0107055 A1 | 4/2017 | Magens |
| 2017/0110017 A1 | 4/2017 | Kimchi |
| 2017/0120443 A1* | 5/2017 | Kang ................. B25J 5/007 |
| 2017/0137235 A1 | 5/2017 | Thompson |
| 2017/0148075 A1 | 5/2017 | High |
| 2017/0158430 A1 | 6/2017 | Raizer |
| 2017/0176986 A1 | 6/2017 | High |
| 2017/0178066 A1 | 6/2017 | High |
| 2017/0178082 A1 | 6/2017 | High |
| 2017/0283171 A1 | 10/2017 | High |
| 2018/0020896 A1 | 1/2018 | High |

FOREIGN PATENT DOCUMENTS

| | | |
|---|---|---|
| CN | 100999277 | 7/2007 |
| CN | 102079433 | 6/2011 |
| CN | 202847767 | 4/2013 |
| CN | 103136923 | 5/2013 |
| CN | 103213115 | 7/2013 |
| CN | 203166399 | 8/2013 |
| CN | 203191819 | 9/2013 |
| CN | 203401274 | 1/2014 |
| CN | 203402565 | 1/2014 |
| CN | 103625808 | 3/2014 |
| CN | 203468521 | 3/2014 |
| CN | 103696393 | 4/2014 |
| CN | 103723403 | 4/2014 |
| CN | 203512491 | 4/2014 |
| CN | 103770117 | 5/2014 |
| CN | 203782622 | 8/2014 |
| CN | 104102188 | 10/2014 |
| CN | 104102219 | 10/2014 |
| CN | 102393739 | 12/2014 |
| CN | 204309852 | 12/2014 |
| CN | 204331404 | 5/2015 |
| DE | 102013013438 | 2/2015 |
| EP | 861415 | 5/1997 |
| EP | 1136052 | 9/2001 |
| EP | 0887491 | 4/2004 |
| EP | 1439039 | 7/2004 |
| EP | 1447726 | 8/2004 |
| EP | 2148169 | 1/2010 |
| EP | 2106886 | 3/2011 |
| EP | 2309487 | 4/2011 |
| EP | 2050544 | 8/2011 |
| EP | 2498158 | 9/2012 |
| EP | 2571660 | 3/2013 |
| EP | 2590041 | 5/2013 |
| EP | 2608163 | 6/2013 |
| EP | 2662831 | 11/2013 |
| EP | 2730377 | 5/2014 |
| FR | 2710330 | 3/1995 |
| GB | 1382806 | 2/1971 |
| GB | 2530626 | 3/2016 |
| GB | 2542472 | 3/2017 |
| GB | 2542905 | 5/2017 |
| JP | 62247458 | 10/1987 |
| JP | H10129996 | 5/1998 |

(56) References Cited

FOREIGN PATENT DOCUMENTS

| | | |
|---|---|---|
| JP | 2003288396 | 10/2003 |
| JP | 2005350222 | 6/2007 |
| JP | 2009284944 | 12/2009 |
| JP | 2010105644 | 5/2010 |
| KR | 20120100505 A | 9/2012 |
| WO | 8503277 A | 8/1985 |
| WO | 9603305 | 7/1995 |
| WO | 1997018523 | 5/1997 |
| WO | 9855903 | 12/1998 |
| WO | 2000061438 | 10/2000 |
| WO | 0132366 | 5/2001 |
| WO | 2004092858 | 10/2004 |
| WO | 2005102875 | 11/2005 |
| WO | 2006056614 | 6/2006 |
| WO | 2006120636 | 11/2006 |
| WO | 2006137072 | 12/2006 |
| WO | 2007007354 | 1/2007 |
| WO | 2007047514 | 4/2007 |
| WO | 2007149196 | 12/2007 |
| WO | 2008118906 | 10/2008 |
| WO | 2008144638 | 11/2008 |
| WO | 2008151345 | 12/2008 |
| WO | 2009022859 | 2/2009 |
| WO | 2009027835 | 3/2009 |
| WO | 2009103008 | 8/2009 |
| WO | 2011063527 | 6/2011 |
| WO | 2012075196 | 6/2012 |
| WO | 2013138193 | 9/2013 |
| WO | 2013138333 | 9/2013 |
| WO | 2013176762 | 11/2013 |
| WO | 2014022366 | 2/2014 |
| WO | 2014022496 | 2/2014 |
| WO | 2014045225 | 3/2014 |
| WO | 2014046757 | 3/2014 |
| WO | 201410171 | 7/2014 |
| WO | 2014116947 | 7/2014 |
| WO | 2014138472 | 9/2014 |
| WO | 2014165286 | 10/2014 |
| WO | 2015021958 | 2/2015 |
| WO | 2015104263 | 7/2015 |
| WO | 2016009423 | 1/2016 |
| WO | 2016015000 | 1/2016 |
| WO | 2016144765 | 9/2016 |

OTHER PUBLICATIONS

Abbrobotics; "ABB Robotics—Innovative Packaging Solutions", https://www.youtube.com/watch?v=e5jif-IUvHY, published on May 16, 2013, pp. 1-5.

Ang, Fitzwatler, et al.; "Automated Waste Sorter With Mobile Robot Delivery Waste System", De La Salle University Research Congress 2013, Mar. 7-9, 2013, pp. 1-7.

Ansari, Sameer, et al.; "Automated Trash Collection & Removal in Office Cubicle Environments", Squad Collaborative Robots, Sep. 27, 2013, pp. 1-23.

Armstrong, Jean, et al.; "Visible Light Positioning: A Roadmap for International Standardization", IEEE Communications Magazine, Dec. 2013, pp. 2-7.

Artal, J.S., et al.; "Autonomous Mobile Robot with Hybrid PEM Fuel-Cell and Ultracapacitors Energy System, Dedalo 2.0", International Conference on Renewable Energies and Power Quality, Santiago de Compostela, Spain, Mar. 28-30, 2012, pp. 1-6.

Atherton, Kelsey D.; "New GPS Receiver Offers Navigation Accurate To An Inch", Popular Science, www.popsci.com/technology/article/2013-08/global-positioning-down-inches, Aug. 16, 2013, pp. 1-2.

Avezbadalov, Ariel, et al.; "Snow Shoveling Robot", engineering.nyu.edu/mechatronics/projects/ME3484/2006/Snow Shoveling Robot/Mechatronics Snow Robot Presentation Update 12-19-06.pdf, 2006, pp. 1-24.

Bares, John, et al.; "Designing Crash-Survivable Unmanned Vehicles", AUVSI Symposium, Jul. 10, 2002, pp. 1-15.

Bohren; Jonathan et al.; "Towards Autonomous Robotic Butlers: Lessons Learned with the PR2", Willow Garage, May 9, 2011, pp. 1-8.

Bouchard, Samuel; "A Robot to Clean Your Trash Bin!", Robotiq, http://blog.robotiq.com/bid/41203/A-Robot-to-Clean-your-Trash-Bin, Aug. 22, 2011, pp. 1-7.

Burns, Tom; "irobot roomba 780 review best robot vacuum floor cleaning robot review video demo", https://www.youtube.com/watch?v=MkwtlyVAaEY, published on Feb. 13, 2013, pp. 1-10.

Bytelight; "Scalable Indoor Location", http://www.bytelight.com/, Dec. 12, 2014, pp. 1-2.

Canadian Manufacturing; "Amazon unleashes army of order-picking robots", http://www.canadianmanufacturing.com/supply-chain/amazon-unleashes-army-order-picking-robots-142902/, Dec. 2, 2014, pp. 1-4.

Capel, Claudine; "Waste sorting—A look at the separation and sorting techniques in today's European market", Waste Management World, http://waste-management-world.com/a/waste-sorting-a-look-at-the-separation-and-sorting-techniques-in-todayrsquos-european-market, Jul. 1, 2008, pp. 1-8.

Carnegie Mellon Univeristy; "AndyVision—The Future of Retail", https://www.youtube.com/watch?v=n5309lLTV2s, published on Jul. 16, 2012, pp. 1-9.

Carnegie Mellon University; "Robots in Retail", www.cmu.edu/homepage/computing/2012/summer/robots-in-retail.shmtl, 2012, pp. 1.

Chopade, Jayesh, et al.; "Control of Spy Robot by Voice and Computer Commands", International Journal of Advanced Research in Computer and Communication Engineering, vol. 2, Issue 4, Apr. 2013, pp. 1-3.

CNET; "iRobot Braava 380t—No standing ovation for this robotic floor mop", https://www.youtube.com/watch?v=JAtC1xFtC6Q, published on May 7, 2014, pp. 1-6.

Coltin, Brian & Ventura, Rodrigo; "Dynamic User Task Scheduling for Mobile Robots", Association for the Advancement of Artificial Intelligence, 2011, pp. 1-6.

Couceiro, Micael S., et al.; "Marsupial teams of robots: deployment of miniature robots for swarm exploration under communication constraints", Robotica, Cambridge University Press, downloaded Jan. 14, 2014, pp. 1-22.

Coxworth, Ben; "Robot designed to sort trash for recycling", Gizmag, http://www.gizmag.com/robot-sorts-trash-for-recycling/18426/, Apr. 18, 2011, pp. 1-7.

Davis, Jo; "The Future of Retail: In Store Now", Online Brands, http://onlinebrands.co.nz/587/future-retail-store-now/, Nov. 16, 2014, pp. 1-5.

Denso; "X-mobility", Oct. 10, 2014, pp. 1-2, including machine translation.

DHL; "Self-Driving Vehicles in Logistics: A DHL perspective on implications and use cases for the logistics industry", 2014, pp. 1-39.

Dorrier, Jason; "Service Robots Will Now Assist Customers at Lowe's Store", SingularityHUB, http://singularityhub.com/2014/10/29/service-robots-will-now-assist-customers-at-lowes-store/, Oct. 29, 2014, pp. 1-4.

Dronewatch; "Weatherproof Drone XAircraft Has 'Black Box'", DroneWatch, http://www.dronewatch.nl/2015/02/13/weatherproof-drone-van-xaircraft-beschikt-over-zwarte-doos/, Feb. 13, 2015, pp. 1-5.

Dyson US; "See the new Dyson 360 Eye robot vacuum cleaner in action #DysonRobot", https://www.youtube.com/watch?v=OadhulCDAjk, published on Sep. 4, 2014, pp. 1-7.

Edwards, Lin; "Supermarket robot to help the elderly (w/Video)", Phys.Org, http://phys.org/news/2009-12-supermarket-robot-elderly-video.html, Dec. 17, 2009, pp. 1-5.

Elfes, Alberto; "Using Occupancy Grids for Mobile Robot Perception and Navigation", IEEE, 1989, pp. 46-57.

Elkins, Herschel T.; "Important 2014 New Consumer Laws", County of Los Angeles Department of Consumer Affairs Community Outreach & Education, updated Jan. 6, 2014, pp. 1-46.

Falconer, Jason; "HOSPI-R drug delivery robot frees nurses to do more important work", Gizmag, http://www.gizmag.com/panasonic-hospi-r-delivery-robot/29565/, Oct. 28, 2013, pp. 1-6.

(56) References Cited

OTHER PUBLICATIONS

Falconer, Jason; "Toyota unveils helpful Human Support Robot", Gizmag, http:/www.gizmag.com/toyota-human-support-robot/24246/, Sep. 22, 2012, pp. 1-6.
Farivar, Cyrus; "This in-store robot can show you the hammer aisle, but not the bathroom", Ars Technica, http://arstechnica.com/business/2014/12/this-in-store-robot-can-show-you-the-hammer-aisle-but-not-the-bathroom/, Dec. 3, 2014, pp. 1-4.
Fellow Robots; "Meet OSHHBOT", http://fellowrobots.com/oshbot/, May 19, 2015, pp. 1-3.
Fellowrobots; "Oshbot Progress—Fellow Robots", https://vimeo.com/139532370, published Sep. 16, 2015, pp. 1-5.
FORA.TV; "A Day in the Life of a Kiva Robot", https://www.youtube.com/watch? v=6KRjuuEVEZs, published on May 11, 2011, pp. 1-11.
GAMMA2VIDEO; "FridayBeerBot.wmv", https://www.youtube.com/watch? v=KXXIIDYatxQ, published on Apr. 27, 2010, pp. 1-7.
Garun, Natt; "Hop the hands-free suitcase follows you around like an obedient pet"; https://www.digitaltrends.com/cool-tech/hop-the-hands-free-suitcase-follows-you-around-like-an-obedient-pet/; Oct. 10, 2012; pp. 1-6.
Glas, Dylan F., et al.; "The Network Robot System: Enabling Social Human-Robot Interaction in Public Spaces", Journal of Human-Robot Interaction, vol. 1, No. 2, 2012, pp. 5-32.
Green, A., et al; "Report on evaluation of the robot trolley", CommRob IST-045441, Advanced Behaviour and High-Level Multimodal Communications with and among Robots, Jun. 14, 2010, pp. 10-67.
Gross, H.-M., et al.; TOOMAS: Interactive Shopping Guide Robots in Everyday Use—Final Implementation and Experiences from Long-term Field Trials, Proc. IEEE/RJS Intern. Conf. on Intelligent Robots and Systems (IROS'09), St. Louis, USA, pp. 2005-2012.
Habib, Maki K., "Real Time Mapping and Dynamic Navigation for Mobile Robots", International Journal of Advanced Robotic Systems, vol. 4, No. 3, 2007, pp. 323-338.
HRJ3 Productions; "Japanese Automatic Golf Cart", https://www.youtube.com/watch?v=8diWYtqb6C0, published on Mar. 29, 2014, pp. 1-4.
Huang, Edward Y.C.; "A Semi-Autonomous Vision-Based Navigation System for a Mobile Robotic Vehicle", Thesis submitted to the Massachusetts Institute of Technology Department of Electrical Engineering and Computer Science on May 21, 2003, pp. 1-76.
IEEE Spectrum; "Warehouse Robots at Work", https://www.youtube.com/watch?v=IWsMdN7HMuA, published on Jul. 21, 2008, pp. 1-11.
Intelligent Autonomous Systems; "TUM James goes shopping", https://www.youtube.com/watch?v=JS2zycc4AUE, published on May 23, 2011, pp. 1-13.
Katic, M., Dusko; "Cooperative Multi Robot Systems for Contemporary Shopping Malls", Robotics Laboratory, Mihailo Pupin Institute, University of Belgrade, Dec. 30, 2010, pp. 10-17.
Kehoe, Ben, et al.; "Cloud-Based Robot Grasping with the Google Object Recognition Engine", 2013, pp. 1-7.
Kendricks, Cooper; "Trash Disposal Robot", https://prezi.com31acae05zf8i/trash-disposal-robot/, Jan. 9, 2015, pp. 1-7.
Kibria, Shafkat, "Speech Recognition for Robotic Control", Master's Thesis in Computing Science, Umea University, Dec. 18, 2005, pp. 1-77.
King, Rachael; "Newest Workers for Lowe's: Robots", The Wall Street Journal, http:/www.wsj.com/articles/newest-workers-for-lowes-robots-1414468866, Oct. 28, 2014, pp. 1-4.
Kitamura, Shunichi; "Super Golf Cart with Remote drive and NAVI system in Japan", https://www.youtube.com/watch?v=2_3-dUR12F8, published on Oct. 4, 2009, pp. 1-6.
Kiva Systems; "Automated Goods-to-Man Order Picking System—Kiva Systems", http://www.kivasystems.com/solutions/picking/, printed on Apr. 2, 2015, pp. 1-2.
Kiva Systems; "Frequently Asked Questions about Kiva Systems—Kiva Systems", http://kivasystems.com/about-us-the-kiva-approach/faq/, printed on Apr. 2, 2015, pp. 1-2.
Kiva Systems; "how a Kiva system makes use of the vertical space—Kiva Systems", http://www.kivasystems.com/solutions/vertical-storage/, printed on Apr. 2, 2015, pp. 1-2.
Kiva Systems; "How Kiva Systems and Warehouse Management Systems Interact", 2010, pp. 1-12.
Kiva Systems; "Kiva replenishment is more productive and accurate than replenishing pick faces in traditional distribution operations", http// www.kivasystems.com/solutions/replenishment/, printed on Apr. 2, 2015, pp. 1-2.
Kiva Systems; "Kiva warehouse control software, Kiva WCS—Kiva Systems", http://www.kivasystems.com/solutions/software/, printed on Apr. 2, 2015, pp. 1-2.
Kiva Systems; "Kiva's warehouse automation system is the most powerful and flexible A . . .", http://www.kivasystems.com/solutions/, printed on Apr. 2, 2015, pp. 1-2.
Kiva Systems; "Shipping Sortation—Kiva Systems", http://www.kivasystems.com/solutions/shipping-sortation/, printed on Apr. 2, 2015, pp. 1-2.
Kohtsuka, T. et al.; "Design of a Control System for Robot Shopping Carts"; KES'11 Proceedings of the 15th International Conference on Knowledge-Based and Intelligent Information and Engineering Systems; Sep. 12-14, 2011; pp. 280-288.
Koubaa, Anis; "A Service-Oriented Architecture for Virtualizing Robots in Robot-as-a-Service Clouds", 2014, pp. 1-13.
Kumar Paradkar, Prashant; "Voice Controlled Robotic Project using interfacing of Ardruino and Bluetooth HC-05", Robotics_Projects_C/C++_Android, Jan. 23, 2016, pp. 1-14.
Kumar, Swagat; "Robotics-as-a-Service: Transforming the Future of Retail", Tata Consultancy Services, http://www.tcs.com/resources/white_papers/Pages/Robotics-as-a-Service.aspx, printed on May 13, 2015, pp. 1-4.
Lejepekov, Fedor; "Yuki-taro. Snow recycle robot.", https://www.youtube.com/watch?v=g12j9PY4jGY, published on Jan. 17, 2011, pp. 1-4.
Liu, Xiaohan, et al.; "Design of an Indoor Self-Positioning System for the Visually Impaired—Simulation with RFID and Bluetooth in a Visible Light Communication System", Proceedings of the 29th Annual International Conference of the IEEE EMBS, Cite Internationale, Lyon, France, Aug. 23-26, 2007, pp. 1655-1658.
Lowe'S Home Improvement; "OSHbots from Lowe's Innovation Labs", https://www.youtube.com/watch?v=W-RKAjP1dtA, published on Dec. 15, 2014, pp. 1-8.
Lowe'S Innovation Labs; "Autonomous Retail Service Robots", http://www.lowesinnovationlabs.com/innovation-robots/, printed on Feb. 26, 2015, pp. 1-4.
Matos, Luis; "wi-Go—The autonomous and self-driven shopping cart"; https://www.indiegogo.com/projects/wi-go-the-autonomous-and-self-driven-shopping-cart; printed on Feb. 27, 2015, pp. 1-16.
Meena, M., & Thilagavathi, P.; "Automatic Docking System with Recharging and Battery Replacement for Surveillance Robot", International Journal of Electronics and Computer Science Engineering, 2012, pp. 1148-1154.
Murph, Darren; "B.O.S.S. shopping cart follows you around", Engadget, http://www.engadget.com/2006/08/11/b-o-s-s-shopping-cart-follows-you-around/, Aug. 11, 2006, pp. 1-4.
Nakajima, Madoka & Haruyama, Shinichiro; "New indoor navigation system for visually impaired people using visible light communication", EURASIP Journal on Wireless Communications and Networking, 2013, pp. 1-10.
Neurobtv; "Shopping Robot TOOMAS 2009", https://www.youtube.com/watch?v=49Pkm30qmQU, published on May 8, 2010, pp. 1-7.
Nickerson, S.B., et al.; "An autonomous mobile robot for known industrial environments", Autonomous Robot for a Known environment, Aug. 28, 1997, pp. 1-28.
Nishimura, S. et al.; "Development of Attachable Modules for Robotizing Daily Items: Person Following Shopping Cart Robot"; Proceedings of the 2007 IEEE International Conference on Robotics and Biomimetics (Sanya, China); Dec. 15-18, 2007; pp. 1506-1511.
O'Donnell, Jake; "Meet the Bluetooth-Connected Self-Following Robo-Caddy of the Future", Sportsgrid; http://www.sportsgrid.com/uncategorized/meet-the-bluetooth-connected-self-following-robo-caddy-of-the-future/, Apr. 22, 2014, pp. 1-5.

(56) References Cited

OTHER PUBLICATIONS

Ogawa, Keisuke; "Denso Demos In-wheel Motor System for Baby Carriages, Shopping Carts", Nikkei Technology, http://techon.nikkeiibp.co.jp/english/NEWS_EN/20141010/381880/?St=english_PRINT, Oct. 10, 2014, pp. 1-2.
Onozato, Taishi et al.; "A Control System for the Robot Shopping Cart"; 2010 IRAST International Congress on Computer Applications and Computational Science (CACS 2010); 2010; pp. 907-910.
Orchard Supply Hardware; "Orchard Supply Hardware's OSHbot", https://www.youtube.com/watch?v=Sp9176vm7Co, published on Oct. 28, 2014, pp. 1-9.
Osborne, Charlie; "Smart Cart Follows You When Grocery Shopping", Smartplanet, http://www.smartplanet.com/blog/smart-takes/smart-cart-follows-you-when-grocery-shopping/, Feb. 29, 2012, pp. 1-4.
Poudel, Dev Bahadur; "Coordinating Hundreds of Cooperative, Autonomous Robots in a Warehouse", Jan. 27, 2013, pp. 1-13.
Robotlab Inc.; "NAO robot drives autonomously it's own car", https://www.youtube.com/watch?v=o6HYwYlo1UE, published on Sep. 8, 2014, pp. 1-6.
Rodriguez, Ashley; "Meet Lowe's Newest Sales Associate—OSHbot, the Robot", Advertising Age, http://adage.com/article/cmo-strategy/meet-lowe-s-newest-sales-associate-oshbot-robot/295591/, Oct. 28, 2014, pp. 1-8.
Scholz, J. et al.; "Cart Pushing with a Mobile Manipulation System: Towards Navigation with Moveable Objects"; Proceedings of the 2011 IEEE International Conference on Robotics and Automation (Shanghai, China); May 9-13, 2011; pp. 6115-6120.
Sebaali, G., et al.; "Smart Shopping Cart", Department of Electrical and Computer Engineering, American University of Beirut, 2014, pp. 1-6.
Shukla, Neha; "SaviOne the Butler Bot: Service Robot for Hospitality Industry", TechieTonics, http://www.techietonics.com/robotonics/savione-the-butler-bot-service-for-hospitality-industry.html, Aug. 14, 2014, pp. 1-5.
SK Telecom Co.; "SK Telecom Launches Smart Cart Pilot Test in Korea"; http://www.sktelecom.com/en/press/press_detail.do?idx=971; Oct. 4, 2011; pp. 1-2.
Song, Guangming, et al.; "Automatic Docking System for Recharging Home Surveillance Robots", http://www.academia.edu/6495007/Automatic_Docking_System_for_Recharging_Home_Surveillance_Robots, IEEE Transactions on Consumer Electronics, vol. 57, No. 2, May 2011, pp. 1-8.
Soper, Taylor; "Amazon vet's new robot-powered apparel startup aims to revolutionize how we buy clothes", GeekWire, http://www.geekwire.com/2012/hointer-robot-jeans-clothing-apparel-store-startup/, Nov. 29, 2012, pp. 1-12.
Stewart Golf; "Introducing the New Stewart Golf X9 Follow", https://www.youtube.com/watch?v=HHivFGtiuE, published on Apr. 9, 2014, pp. 1-9.
Sun, Eric; ""Smart Bin & Trash Route" system—RMIT 2012 Green Inventors Competition", http://www.youtube.com/watch?v=OrTA57alO0k, published on Nov. 14, 2012, pp. 1-8.

Superdroid Robots; "Cool Robots, Making Life Easier", http://www.superdroidrobots.com/shop/custom.aspx/cool-robots-making-life-easier/83/, printed on Jun. 16, 2015, pp. 1-7.
Swisslog; "RoboCourier Autonomous Mobile Robot", http://www.swisslog.com/en/Products/HCS/Automated-Material-Transport/RoboCourier-Autonomous-Mobile-Robot, printed May 27, 2015, pp. 1.
Universal Robotics; "Neocortex Enables Random Part Handling and Automated Assembly", http://www.universalrobotics.com/random-bin-picking, printed on Dec. 22, 2015, pp. 1-3.
Uphigh Productions; "Behold the Future (E017 Robot Sales Assistant)", https://www.youtube.com/watch?v=8WbvjaPm7d4, published on Nov. 19, 2014, pp. 1-7.
Urankar, Sandeep, et al.; "Robo-Sloth: A Rope-Climbing Robot", Department of Mechanical Engineering, Indian Institute of Technology, 2003, pp. 1-10.
Vasilescu, Iuliu, et al.; "Autonomous Modular Optical Underwater Robot (AMOUR) Design, Prototype and Feasibility Study", Apr. 18, 2005, pp. 1-7.
Vmecavacuumtech; "VMECA Magic Suction Cup with ABB robot for pick and place (packaging application)", https://www.youtube.com/watch?v=5btR9MLtGJA, published on Sep. 14, 2014, pp. 1-4.
Wang, Xuan; "2D Mapping Solutions for Low Cost Mobile Robot", Master's Thesis in Computer Science, Royal Institute of Technology, KTH CSC, Stockholm, Sweden, 2013, pp. 1-60.
Webb, Mick; "Robovie II—the personal robotic shopping", Gizmag, http://www.gizmag.com/robovie-ii-robotic-shopping-assistance/13664/, Dec. 23, 2009, pp. 1-5.
Weise, Elizabeth; "15,000 robots usher in Amazon's Cyber Monday", USAToday, http://www.usatoday.com/story/tech/2014/12/01/robots-amazon.kiva-fulfillment-centers-cyber-monday/19725229/, Dec. 2, 2014, pp. 1-3.
Weiss, C.C.; "Multifunctional hybrid robot shovels snow and mows your lawn", Gizmag, http://www.gizmag.com/snowbyte-snow-shoveling-robot/32961/, Jul. 21, 2014, pp. 1-7.
Wikipedia; "Kiva Systems", http://en.wikipedia.org/wiki/Kiva_Systems, printed on Apr. 2, 2015, pp. 1-3.
Wikipedia; "Leeds Kirkgate Market"; https://en.wikipedia.org/wiki/Leeds_Kirkgate_Market; Retrieved on Apr. 5, 2017; 8 pages.
Wired; "High-Speed Robots Part 1: Meet BettyBot in "Human Exclusion Zone" Warehouses—The Window—Wired", https://www.youtube.com/watch?v=8gy5tYVR-28, published on Jul. 2, 2013, pp. 1-6.
Wulf, O., et al.; "Colored 2D maps for robot navigation with 3D sensor data," Institute for Systems Engineering, University of Hannover, Hannover, Germany, 2014, pp. 1-6.
YRF; "The Diamond Robbery—Scene Dhoom:2 Hrithik Roshan", https://www.youtube.com/watch?v=3bMYgo_S0Kc, published on Jul. 12, 2012, pp. 1-7.
Tam, Donna; "Meet Amazon's busiest employee—the Kiva robot"; http://www.cnet.com/news/meet-amazons-busiest-employee-the-kiva-robot/; Nov. 30, 2014; pp. 1-6.
GB; App. No. GB1704956.0; Combined Search and Examination Report dated Sep. 21, 2017.

* cited by examiner

SYSTEMS AND METHODS FOR MOVING PALLETS VIA UNMANNED MOTORIZED UNIT-GUIDED FORKLIFTS

CROSS-REFERENCE TO RELATED APPLICATION

This application claims the benefit of U.S. Provisional Application No. 62/316,782, filed Apr. 1, 2016, which is incorporated herein by reference in its entirety.

TECHNICAL FIELD

This disclosure relates generally to managing inventory at retail sales facilities and, in particular, to systems and methods for moving product-containing pallets via forklifts guided by unmanned motorized units.

BACKGROUND

Distribution centers and backrooms of product distribution and/or storage facilities are often buzzing with multiple forklifts manned with forklift operators. The safety of such operation often depends on the experience of a forklift operator and the care taken by the forklift operator during freight lifting and moving operations. In addition, the forklift route throughout the facilities is typically determined by the forklift operators during use. A disadvantage of such systems is that safety issues arise when numerous forklifts operated by numerous forklift operators are operating within a space where blind spots and/or other obstacles exist. In addition, reliance on human judgment to determine the routes of the forklifts throughout the facilities often do not result in optimized movements of the forklifts throughout the facility during operation.

BRIEF DESCRIPTION OF THE DRAWINGS

Disclosed herein are embodiments of systems, devices, and methods pertaining to methods and systems for moving product-containing pallets via forklifts guided by unmanned motorized units. This description includes drawings, wherein.

Figure 1:
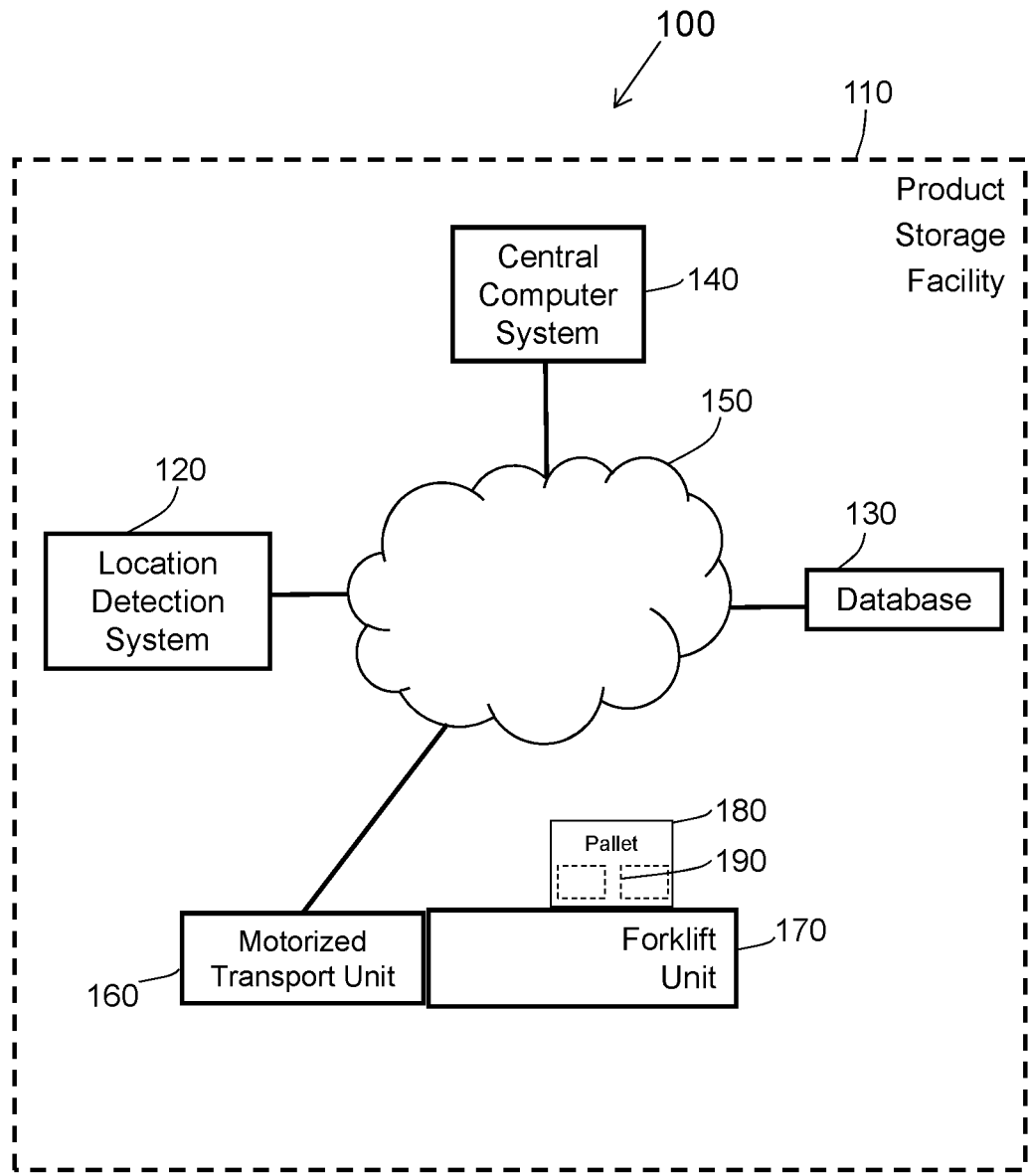
FIG. 1 is a diagram of a system for moving product-containing pallets via forklifts guided by unmanned motorized units in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally, the systems, devices, and methods described herein provide for coordinated movement of pallets at a product storage facility via motorized unit-guided forklifts.

In one embodiment, a system for facilitating movement of product-containing pallets includes at least one forklift unit configured to lift and move the product-containing pallets; at least one motorized transport unit including a processor-based control circuit and configured to mechanically engage and disengage a respective forklift unit; a central computer system in two-way communication with the at least one motorized transport unit, the central computer system being configured to transmit at least one signal to the at least one motorized transport unit, the at least one signal configured to cause the at least one motorized transport unit to control the at least one forklift unit to move at least one of the product-containing pallets.

In another embodiment, a method of facilitating movement of product-containing pallets includes: providing at least one forklift unit configured to lift and move the product-containing pallets; providing at least one motorized transport unit including a processor-based control circuit and configured to mechanically engage and disengage a respective forklift unit; providing a central computer system in two-way communication with the at least one motorized transport unit; and transmitting at least one signal from the central computer system to the at least one motorized transport unit, the at least one signal causing the at least one motorized transport unit to control the at least one forklift unit to move at least one of the product-containing pallets.

FIG. 1 shows an embodiment of a system 100 implemented in whole or in part at a product storage facility 110 for facilitating movement of pallets 180 that contain products 190. It will be understood that the details of this example are intended to serve in an illustrative capacity and are not necessarily intended to suggest any limitations in regards to the present teachings. Generally, as shown in FIG. 1, the exemplary system 100 includes one or more forklift units 170 configured to lift and move one or more pallets 180 that contain one or more products 190, as well as one or more motorized transport units 160 configured to mechanically engage and disengage a respective forklift unit 170, a central computer system 140 having at least one control circuit in two-way communication with the motorized transport units 160; a database 130, a location detection system 120, and a network 150. It is understood that more or fewer of such components may be included in different embodiments of the system 100.

The product storage facility 110 may be any facility (e.g., warehouse, stock room of a store, product sorting facility, product distribution facility, or the like) where products 190 are stored. While the present application refers to pallets 180 in the context of the objects being moved around by the forklift units 170, it will be appreciated that the principles described herein are applicable to any structure other than pallets 180 that may contain products 190 and may be moved by a forklift unit 170, including but not limited to boxes, totes, bins, packages, or the like. The pallets 180 and/or products 190 at the product storage facility 110 may be delivered to the product storage facility 110, for example, from a product manufacturer, a product distribution facility, or the like, and may be moved around at the product storage facility 110 for storage purposes loading purposes (e.g., onto delivery trucks), and/or unloading purposes (e.g., unloaded from a pallet and placed onto a storage shelf, into a storage bin, or into a box for delivery).

Generally, the motorized transport units 160 are located at the product storage facility 110 and are configured to move throughout the space of the product storage facility 110 and to mechanically engage and disengage the forklift units 170, as described in more detail below. In some embodiments, the motorized transport units 160 are configured to either comprise, or to selectively and detachably couple to, a corresponding forklift unit 170 that is configured to lift and move one or more pallets 180 that contain one or more products 190.

The motorized transport units 160 do not require the presence of and physical operation by a human operator and wirelessly communicate with, and are wholly or largely controlled by, the central computer system 140. In particular, in some embodiments, the central computer system 140 is configured to control movement of the motorized transport units 160 through the product storage facility 110 based on a variety of inputs. For example, the central computer system 140 communicates with each motorized transport unit 160 via the network 150, which may be one or more wireless networks of one or more wireless network types (such as, a wireless local area network, a wireless personal area network, a wireless mesh network, a wireless star network, a wireless wide area network, a cellular network, and so on), capable of providing wireless coverage of the desired range of the motorized transport units 160 according to any known wireless protocols, including but not limited to a cellular, Wi-Fi, Zigbee or Bluetooth network.

In the exemplary system 100 of FIG. 1, the central computer system 140 is in two-way communication with the motorized transport units 160 via a network 150. In some embodiments, as will be described below, the central computer system 140 is configured to transmit at least one signal to one or more motorized transport units 160 to cause the motorized transport units 160 to control their respective forklift units 170 in order to move one or more of the pallets 180 that contain products 190 at the product storage facility 110.

The central computer system 140 of system 100 may be a stationary or portable electronic device, for example, a desktop computer, a laptop computer, a tablet, a mobile phone, or any other electronic device including a processor-based control circuit (i.e., control unit). In the embodiment of FIG. 1, the central computer system 140 is configured for data entry and processing as well as for communication with other devices (e.g., motorized transport units 160) of system 100 via the network 150 which may be a wide-area network (WAN), a local area network (LAN), a personal area network (PAN), a wireless local area network (WLAN), or any other internet or intranet network, or combinations of such networks. The central computer system 140 may be located at the same physical location as the motorized transport units 160 (i.e., at the product storage facility 110), or at a location remote to the motorized transport units 160 (e.g., a central or regional data storage facility).

Figure 2:
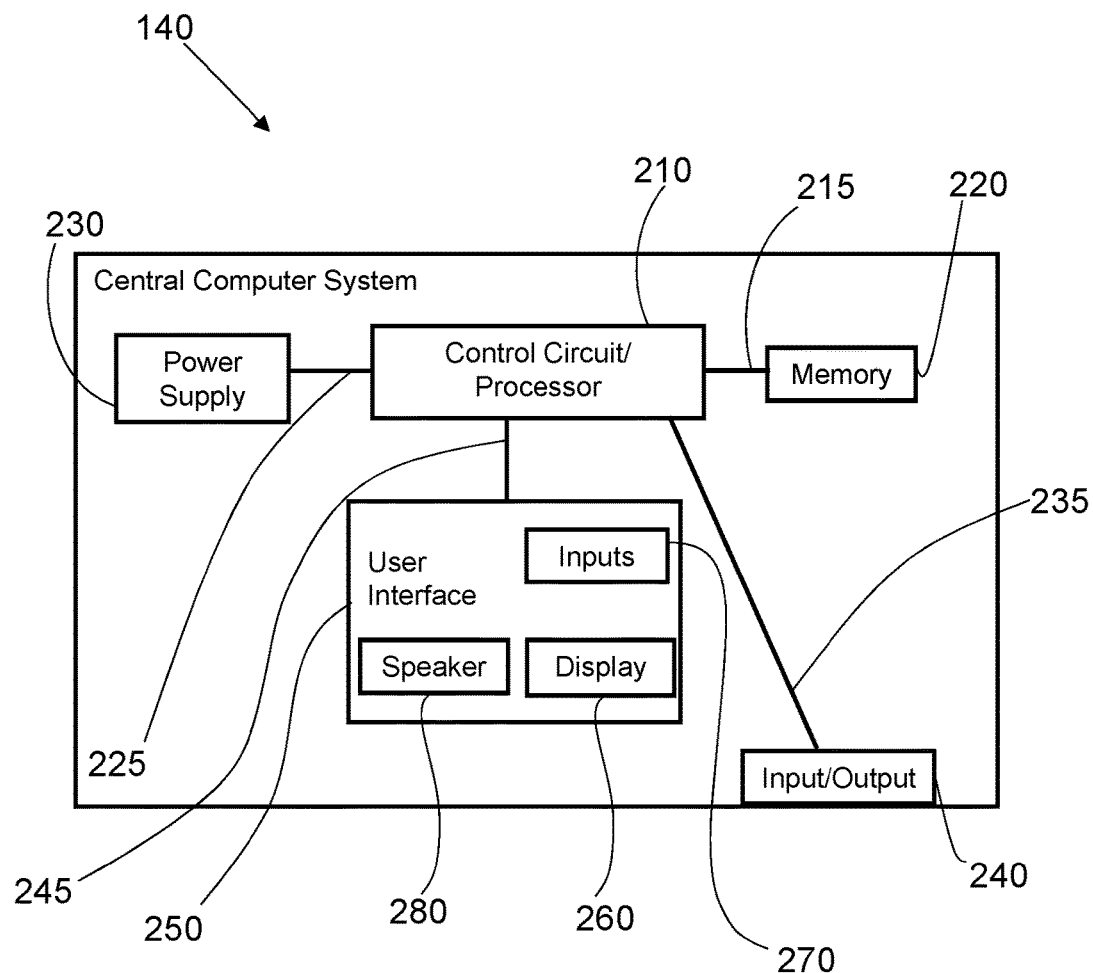
FIG. 2 is a functional block diagram of a central computer system in accordance with some embodiments.

With reference to FIG. 2, the central computer system 140 configured for use with exemplary systems and methods described herein may include a control circuit 210 including a processor (e.g., a microprocessor or a microcontroller) electrically coupled via a connection 215 to a memory 220 and via a connection 225 to a power supply 230. The control unit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

This control unit 210 can be configured (for example, by using corresponding programming stored in the memory 220 as will be well understood by those skilled in the art) to carry out one or more of the steps, actions, and/or functions described herein. In some embodiments, the memory 220 may be integral to the processor-based control unit 210 or can be physically discrete (in whole or in part) from the control unit 210 and is configured non-transitorily store the computer instructions that, when executed by the control unit 210, cause the control unit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control unit 210 of the central computer system 140 is also electrically coupled via a connection 235 to an input/output 240 (e.g., wireless interface) that can receive wired or wireless signals from one or more of the motorized transport units 160. Also, the input/output 240 of the central computer system 140 can send signals to the motorized transport units 160 indicating which pallet 180 to pick up via the forklift unit 170, where to move the pallet 180 via the forklift unit 170, and where to drop off the pallet 180 via the forklift unit 170.

In the embodiment shown in FIG. 2, the processor-based control unit 210 of the central computer system 140 is electrically coupled via a connection 245 to a user interface 250, which may include a visual display or display screen 260 (e.g., LED screen) and/or button input 270 that provide the user interface 250 with the ability to permit an operator, such as a worker at the product storage facility 110 where the system 100 is implemented, of the central computer system 140 to manually control the central computer system 140 by inputting commands via touch-screen and/or button operation and/or voice commands to, for example, to send a signal to a motorized transport unit 160 to instruct the motorized transport unit 160 to: move underneath a forklift unit 170 and couple to a forklift unit 170; uncouple from the forklift unit 170; control movement of the forklift unit 170 in order to pick up a pallet 180 and/or to set down the pallet 180 and/or to move the pallet 180 within the space of the product storage facility 110. It will be appreciated that the performance of such functions by the processor-based control unit 210 of the central computer system 140 is not dependent on actions of a human operator, and that the control unit 210 may be programmed to perform such functions without being actively controlled by a human operator.

In some embodiments, the display screen 260 of the central computer system 140 is configured to display various graphical interface-based menus, options, and/or alerts that may be transmitted from and/or to the central computer system 140 in connection with various aspects of the moving pallets 180 around the product storage facility 110. The inputs 270 of the central computer system 140 may be configured to permit an operator to navigate through the on-screen menus on the central computer system 140 and make changes and/or updates to the routes and destinations of the forklift units 170 at the product storage facility 110. It will be appreciated that the display screen 260 may be configured as both a display screen and an input 270 (e.g., a touch-screen that permits an operator to press on the display screen 260 to enter text and/or execute commands.)

In some embodiments, the central computer system 140 automatically generates a travel route for one or more motorized transport units 660 through the space of the product storage facility 110. In some embodiments, this route is based on a location of a motorized transport unit 160 and/or a forklift unit 170 and/or a target pallet 180 and/or the intended destination of the pallet 180 and/or locations of other pallets 180 and/or other obstacles at the product storage facility 110. The central computer system 140 may calculate multiple possible optimum routes. The route chosen by the central computer system 140. In some embodiments, the system 100 is capable of integrating 2D and 3D maps of the product storage facility 110 with physical locations of objects at the product storage facility 110. Once the central computer system 140 maps all objects to specific locations using algorithms, measurements and LED geo-location, for example, grids are applied which sections off the maps into access ways and blocked sections. Motorized transport units 160 may use these grids for navigation and recognition. In some embodiments, grids are applied to 2D horizontal maps along with 3D models. In some embodiments, grids start at a higher unit level and then can be broken down into smaller units of measure by the central computer system 140 when needed to provide more accuracy.

In the embodiment shown in FIG. 1, the central computer system 140 is configured to access at least one database 130. The central computer system 140 and the database 130 may be implemented as separate physical devices as shown in FIG. 1 (which may be at one physical location or two separate physical locations), or may be implemented as a single device at the product storage facility 110 (or at a location remote to the product storage facility 110). In some embodiments, the database 130 may be stored, for example, on non-volatile storage media (e.g., a hard drive, flash drive, or removable optical disk) internal or external to the central computer system 140, or internal or external to computing devices distinct from the central computer system 140. In some embodiments, the database 130 is cloud-based.

The exemplary database 130 of FIG. 1 is configured to store electronic data including, but not limited to: data associated with the products 190 (e.g., location of origin of a product 190, destination of the product 190, storage requirements for the product 190, special instructions for the product 190, etc.), data associated with the pallets 180 being used to store the products 190 (e.g., location of a pallet 180, orientation of a pallet at the pick-up location, weight of a pallet 180, destination of a pallet 180 as it is being moved by a forklift unit 170, identification of products 190 on the pallet 180, etc.); data associated with the forklift units 170 being used to move the pallets 180 (e.g., location of each forklift unit 170, identification of pallets 180 on the forklift unit 170, route of forklift unit 170 from the pick-up of a pallet 180 to the drop off of the pallet 180, etc.); data associated with the motorized transport units 160 being used to control movement of the forklift units 170 (e.g., location of each motorized transport unit 160, identification of the forklift unit 170 being controlled by the motorized transport unit 160, route assigned to the motorized transport unit 160, etc.); and/or data associated with the central computer system 140 (e.g., data transmitted by and received by the central computer system 140, data relating to the tracking and routing of movement of the motorized transport units and/or forklift units 170, etc.).

In some embodiments, a location detection system 120 is provided at the product storage facility 110. The location detection system 120 provides input to the central computer system 140 useful to help determine the location of one or more of the motorized transport units 160 within the space of the product storage facility 110.

In some embodiments, the location detection system 120 includes a series of light sources (e.g., LEDs (light-emitting diodes)) that are mounted at known positions (e.g., in the ceiling) throughout the space of the product storage facility 110 and that each encode data in the emitted light that identifies the source of the light (and thus, the location of the light). As a given motorized transport unit 160, or as a forklift unit 170, or as a pallet 180 moves through the space of the product storage facility 110, light sensors (or light receivers) on the motorized transport unit 160 and/or on the forklift unit 170 and/or on the pallet 180 being transported by the forklift unit 170 receive the light and can decode the data. This data is sent back to the central computer system 140 which can determine the position of the motorized transport unit 160 and/or of the forklift unit 170 and/or of the pallet 180 by the data of the light it receives in real time, since the central computer system 140 can relate the light data to a mapping of the light sources to known locations at the product storage facility 110. Generally, such lighting systems are known and commercially available, e.g., the ByteLight system from ByteLight of Boston, Mass. In embodiments using a ByteLight system, a typical display screen of the typical smart phone device can be used as a light sensor or light receiver to receive and process data encoded into the light from the ByteLight light sources.

In other embodiments, the location detection system 120 includes a series of low energy radio beacons (e.g., Bluetooth low energy beacons) at known positions throughout the space of the product storage facility 110 and that each encode data in the emitted radio signal that identifies the beacon (and thus, the location of the beacon). As a given motorized transport unit 160 and/or forklift unit 170 and/or pallet 180 moves through the space of the product storage facility 110, low energy receivers of the motorized transport unit 160 and/or of the forklift unit 170 and/or of the pallet 180 being transported by the forklift unit 170 receive the radio signal and can decode the data. This data is sent back to the central computer system 140 which can determine the position of the motorized transport unit 160 and/or forklift unit 170 and/or pallet 180 by the location encoded in the radio signal it receives, since the central computer system 140 can relate the location data to a mapping of the low energy radio beacons to locations at the product storage facility 110. Such low energy radio systems are known and commercially available. In embodiments using a Bluetooth low energy radio system, a typical Bluetooth radio of a typical smart phone device can be used as a receiver to receive and process data encoded into the Bluetooth low energy radio signals from the Bluetooth low energy beacons.

In still other embodiments, the location detection system 120 includes a series of audio beacons at known positions throughout the space of the product storage facility 110 and that each encode data in the emitted audio signal that identifies the beacon (and thus, the location of the beacon). As a given motorized transport unit 160 and/or the forklift unit 170 moves through the space, microphones on the motorized transport unit 160 and/or on the forklift unit 170 and/or on a pallet 180 being transported by the forklift unit 170 receive the audio signal and can decode the data. This data is sent back to the central computer system 140 which can determine the position of the motorized transport unit 160 and/or of the forklift unit 170 and/or of the pallet 180 by the location encoded in the audio signal it receives in real time, since the central computer system 140 can relate the location data to a mapping of the audio beacons to known locations at the product storage facility 110. Generally, such audio beacon systems are known and commercially available. In embodiments using an audio beacon system, a typical microphone of a typical smart phone device can be used as a receiver to receive and process data encoded into the audio signals from the audio beacon.

In some embodiments, the location detection system 120 includes a series of label readers (e.g., barcode readers, radio frequency identification (RFID) readers, near field communication (NFC) readers, ultra-wideband (UWB) readers, image/video readers, or the like readers) that are mounted at known positions throughout the space of the product storage facility 110. By the same token, the pallets 180, and/or motorized transport units 160, and/or forklift units 170 may include labels thereon uniquely identifying each of the pallets 180, and/or motorized transport units 160, and/or forklift units 170 when scanned by such reader. As a given motorized transport unit 160, or as a forklift unit 170, or as a pallet 180 moves through the space of the product storage facility 110, the label readers scan the labels on the motorized transport units 160 and/or the forklift units 170 and/or the pallets 180 being transported by the forklift units 170 receive the label data and can decode the data to uniquely identify the motorized transport unit 160, forklift unit 170, and/or pallet 180 associated with the scanned label. This data is sent back to the central computer system 140 which can determine the position of the motorized transport unit 160 and/or of the forklift unit 170 and/or of the pallet 180 by the identification data it receives in real time, since the central computer system 140 can relate the identification data decoded from the labels to a mapping of the label readers at known locations at the product storage facility 110.

In some embodiments, the motorized transport units 160 and/or the forklift units 170 and/or the pallets 180 may include a global positioning system (GPS) tracking devices that permit a GPS-based identification of the location of the motorized transport units 160 and/or the forklift units 170 and/or the pallets 180 in real time by the central computer system 140.

In some embodiments, the location detection system 120 of the exemplary system 100 may include one or more video cameras. Captured video imagery from the video cameras can be provided to the central computer system 140. This information can then serve, for example, to help the central computer system 140 determine a present location of one or more of the motorized transport units 160 and/or determine issues or concerns regarding automated movement of the motorized transport units 160 in the space of the product storage facility 110. For example, such video information can permit the central computer system 140, at least in part, to detect an object in a path of movement of a particular one of the motorized transport units 160. In one approach, the video cameras may comprise existing surveillance equipment employed at the product storage facility 110 to serve, for example, various security purposes. By another approach, the video cameras may be dedicated to providing video content to the central computer system 140 to facilitate control of the motorized transport units 160 by the central computer system 140. In some embodiments, the video cameras may have a selectively movable field of view and/or zoom capability that the central computer system 140 controls as appropriate to help ensure receipt of useful information relative to the space within the product storage facility 110 by the central computer system 140 in real time.

Optionally, the central computer system 140 can operably couple to one or more user interface computing devices (comprising, for example, a display and a user input interface such as a keyboard, touch screen, and/or cursor-movement device). Such a user interface computing device can permit, for example, a worker (e.g., an associate, analyst, etc.) to monitor the operations of the central computer system 140 and/or to attend to any of a variety of administrative, configuration or evaluation tasks as may correspond to the programming and operation of the central computer system 140. Such user interface computing devices may be at or remote from the product storage facility 110 and may access one or more the databases 130.

In some embodiments, the system 100 may include a plurality of user interface units configured to communicate with the central computer system 140. These teachings will accommodate a variety of user interface units including, but not limited to, mobile and/or handheld electronic devices such as so-called smart phones and portable computers such as tablet/pad-styled computers. The user interface units may wirelessly communicate with the central computer system 140 via a wireless network (e.g., Wi-Fi), such as the network 150 of the product storage facility 110. The user interface units generally provide a user interface for interaction with the system 100 by a worker at the product storage facility 110.

The motorized transport units 160 may run low or out of power when used. Before this happens, the motorized transport units 160 need to recharge to stay in service. Optionally, the system 100 may include at least one motorized transport unit docking station. Such docking stations may provide locations where the motorized transport units 160 can charge, after coupling to the docking stations. For example, the motorized transport units 160 may be stored and/or charged at the docking stations for later use, and/or may be serviced at the docking stations. The motorized transport units 160 are permitted to self-dock and recharge at a docking station to stay at maximum efficiency, when not in use. When use of the motorized transport units 160 is completed, the motorized transport units 160 may return to a docking station. In some embodiments, if the power is running low during use, a replacement motorized transport unit 160 can be assigned to move into position and replace the motorized transport unit 160 with low power.

In accordance with some embodiments, a motorized transport unit 160 detachably connects to a forklift unit 170 and is configured to navigate the forklift unit 170 through the space of the product storage facility 170 under control of the central computer system 140 and, optionally, under control of a user interface unit. To that end, the forklift unit 170 includes a forklift interface connection 175 configured to permit coupling of the motorized transport unit 160 thereto, and the motorized transport unit 160 includes a control interface connection 165 configured to couple to and decouple from the forklift interface connection 175, such that when the control interface connection 165 is coupled to the forklift interface connection 175, the motorized transport unit 160 controls the forklift unit 170 via the control interface connection 165 and the forklift interface connection 170, as described in more below. In some embodiments, the motorized transport unit 160 may removably latch to, connect to, or otherwise attach to a portion of the forklift unit 170 such that the movable forklift unit 170 can be moved by the motorized transport unit 160. For example, a motorized transport unit 160 can connect to a forklift unit 170 using a hook, a mating connector, a magnet, or the like. For example, a motorized transport unit 160 can move to a position next to or underneath the forklift unit 170, align itself with the forklift unit 170 (e.g., using sensors) and then engage a surface of the forklift unit 170 to detachably couple to the forklift unit 170. After the motorized transport unit 160 is coupled to the forklift unit 170, the motorized transport unit 160 can move throughout the space of the product storage facility 110 while being coupled to, and navigating movement of the forklift unit 170 under the control of the central computer system 140.

Figure 3A:
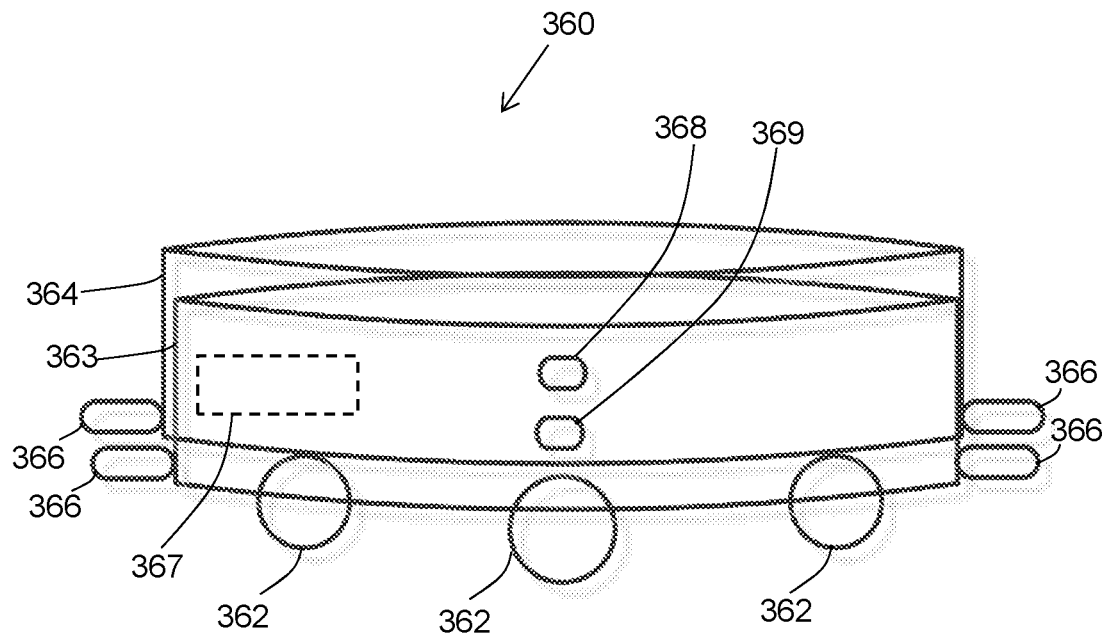
FIG. 3A is an illustration of a motorized transport unit of the system of FIG. 1 in a retracted orientation in accordance with some embodiments.
Figure 3B:
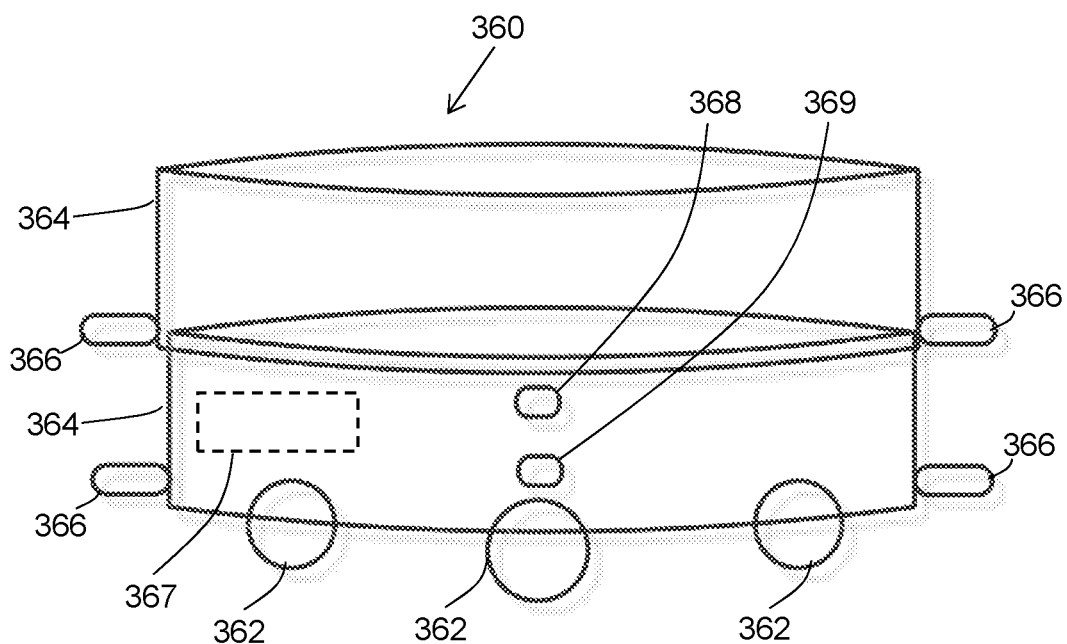
FIG. 3B is an illustration of a motorized transport unit of the system of FIG. 1 in an extended orientation in accordance with some embodiments.

FIGS. 3A and 3B illustrate some embodiments of a motorized transport unit 360, similar to the motorized transport unit 160 shown in the system of FIG. 1. In this embodiment, the motorized transport unit 360 takes the form of a disc-shaped robotic device having motorized wheels 362, a lower body portion 363 and an upper body portion 364 that fits over at least part of the lower body portion 363. It is noted that in other embodiments, the motorized transport unit 360 may have other shapes and/or configurations, and is not limited to disc-shaped. For example, the motorized transport unit 360 may be cubic, octagonal, triangular, or other shapes, and may be dependent on the configuration of the forklift unit 170 with which the motorized transport unit 360 is intended to cooperate. In the exemplary embodiment shown in FIGS. 3A and 3B, the motorized transport unit 360 includes guide members 366 that facilitate the coupling of the motorized transport unit 360 to the forklift unit 170. The guide members 366 are embodied as pegs or shafts that extend horizontally from the upper body portion 364 and/or the lower body portion 363. In some embodiments, the guide members 366 may assist docking the motorized transport unit 360 to an optional docking station described above.

The exemplary motorized transport unit 360 further includes one or more sensors 368 that facilitate the docking of the motorized transport unit 360 to a forklift unit 170. The exemplary motorized transport unit 360 further includes one or more sensors 369 that are configured to receive a light source (or sound waves) emitted from light sources (or sound sources) around the product storage facility 110, and thus facilitate the determination of the location of the motorized transport unit 160 via the location detection system 120 by the central computer system 140. In some embodiments, instead of or in addition to the sensors 369, the motorized transport unit 360 may include a beacon as described above that facilitates the determination of the location of the motorized transport unit 160 via the location detection system 120 by the central computer system 140.

In FIG. 3A, the motorized transport unit 360 is shown in a retracted position in which the upper body portion 364 fits over the lower body portion 363 such that the motorized transport unit 360 is in its lowest profile orientation which is generally the preferred orientation for movement of the motorized transport unit 360 when the motorized transport unit 360 is unattached to a forklift unit 170 and/or when the motorized transport unit 360 moves underneath a forklift unit 170, for example. In FIG. 3B, the motorized transport unit 360 is shown in an extended position in which the upper body portion 364 is moved upward relative to the lower body portion 363 such that the motorized transport unit 360 is in its highest profile orientation for movement when the motorized transport unit 360 is coupled to a forklift unit 170 and/or lifting the forks of the forklift unit 170, for example. The mechanism within the motorized transport unit 360 is designed to provide sufficient lifting force to lift the weight of the upper body portion 364 and other objects to be lifted by the motorized transport unit 360, such as the forks of the forklift unit 170 and one or more pallets 180 placed on the forks of the forklift unit 170.

In some embodiments, the lower body portion 363 and the upper body portion 364 are capable to moving independently of each other. For example, the upper body portion 364 may be raised and/or rotated relative to the lower body portion 363. That is, one or both of the upper body portion 364 and the lower body portion 363 may move toward/away from the other or rotated relative to the other. In some embodiments, in order to raise the upper body portion 364 relative to the lower body portion 363, the motorized transport unit 360 includes an internal lifting system (e.g., including one or more electric actuators or rotary drives or motors). Numerous examples of such motorized lifting and rotating systems are known in the art. Accordingly, further elaboration in these regards is not provided here for the sake of brevity.

Figure 4:
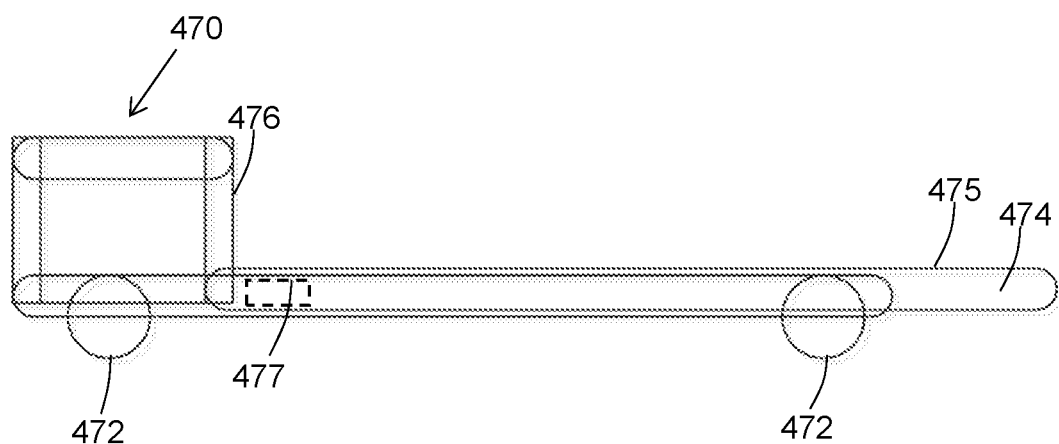
FIG. 4 is an illustration of a forklift unit of the system of FIG. 1 in accordance with some embodiments.
Figure 5:
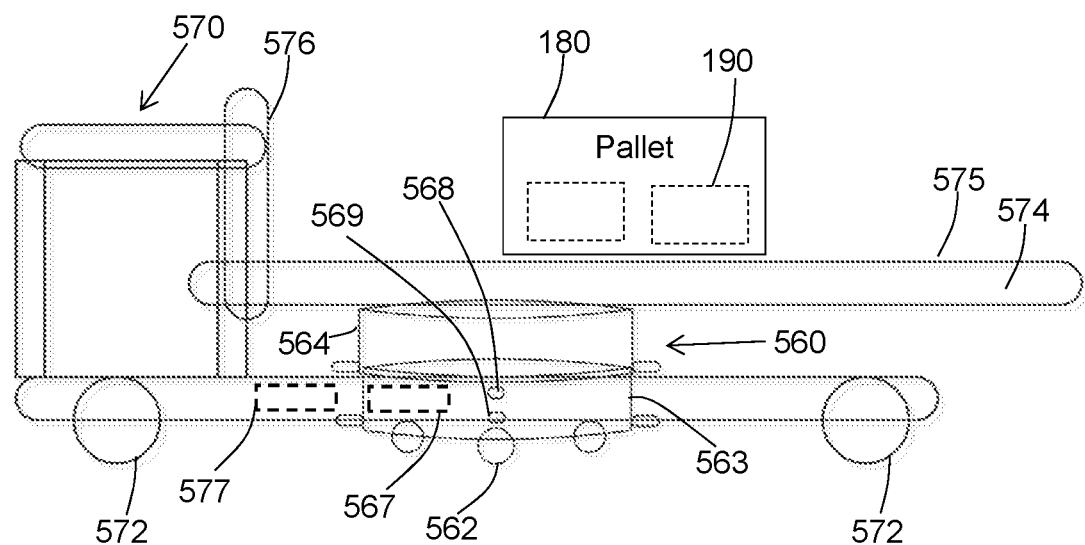
FIG. 5 is an illustration of the motorized transport unit of FIGS. 3A and 3B detachably coupling to the forklift unit of FIG. 4, in accordance with some embodiments.

FIG. 4 illustrates an exemplary embodiment of a forklift unit 470 usable with the system 100 of FIG. 1. The exemplary forklift unit 470 includes wheels 472 that enable the forklift unit 170 to move around the product storage facility 110. The forklift unit 470 includes forks 474 that provide a support surface 475 to lift and transport a pallet 180 containing products 190. The forklift unit 470 further includes a mast 476 coupled to the forks 474. The forks 474 may be movable up and down along the mast 476 via the force/support provided by the motorized transport unit (as in FIG. 5), or may be movable by a hydraulic motor internal to the forklift unit 470 (not shown). In the embodiment of FIG. 4, the forklift unit 470 also includes a forklift interface connection 477 of the forklift unit 570 configured to couple to the control interface connection 367 of the motorized transport unit 360 to enable the motorized transport unit 360, when coupled to the forklift unit 470, to control movements of the forklift unit 470 via, for example, electrical or wireless communication between the control interface connection 367 and the forklift interface connection 477. After the motorized transport unit FIG. 5 illustrates an embodiment of the motorized transport unit 560 detachably engaging a forklift unit 570 having a pallet 180 including products 190 located on the support surface 575 of the forks 574. As explained above, the motorized transport unit 560 is in the retracted orientation as in FIG. 3A when it moves around the product storage facility 170 prior to being coupled to a forklift unit 170. In some embodiments, the motorized transport unit 560 is guided by the central computer system 140 (e.g., via the location detection system 120 and sensor 569 of the motorized transport unit 560) to a position underneath a forklift unit 570 selected by the central computer system 140.

After the motorized transport unit 560 is in position underneath the forklift unit 570 (e.g., the correct position may be determined, for example, via the sensor 568 of the motorized transport unit 560), as illustrated in FIG. 5, the control interface connection 567 of the motorized transport unit 560 couples to the forklift interface connection 577 of the forklift unit 570 to enable the motorized transport unit 560 to control movements of the forklift unit 570 via the control interface connection 567 (which receives movement guiding signals from the central computer system 140) and the forklift interface connection 577 (e.g., via electrical and/or wireless signals transmitted from the control interface connection 567 to the forklift interface connection 577 and vice versa). After the motorized transport unit 560 is in the position shown in FIG. 5, and the control interface connection 567 of the motorized transport unit 560 is coupled to the forklift interface connection 577 of the forklift unit 570, the motorized transport unit 560 is moved to the extended position of FIGS. 3 and 5, with the upper body portion 564 rising to a greater height relative to the lower body portion 563 such that the forks 574 of the forklift unit 570 are lifted up by the motorized transport unit 560, with the wheels 572 of the forklift unit 570 remaining on the ground.

In the orientation shown in FIG. 5 the motorized transport unit 560 is able to move the forklift unit 570 throughout the space of the product storage facility 110. It is noted that in these embodiments, the motorized transport unit 560 does not bear the weight of the entire forklift unit 570 since the wheels 572 of the forklift unit 570 rest on the floor. It will be appreciated that while the motorized transport unit 560 may be configured to lift the forks 574 via a lifting mechanism internal to the motorized transport unit 560 as shown in FIG. 5, in some embodiments, the motorized transport unit 560 may be configured to activate a switch on a forklift unit 570 such that a motor (e.g., a hydraulic motor) is activated and exerts the force necessary to lift the forks 574 without requiring the motorized transport unit 560 to be extended into the position shown in FIG. 5. In some optional embodiments the forklift unit 570 may be equipped with warning lights (e.g., turn signals, reverse signals, blinking lights, etc.) and/or warning sounds that visually and/or audibly indicate movement of the forklift unit 570 such that workers at the product storage facility 110 are aware of the movements of the forklift unit 570.

Figure 6:
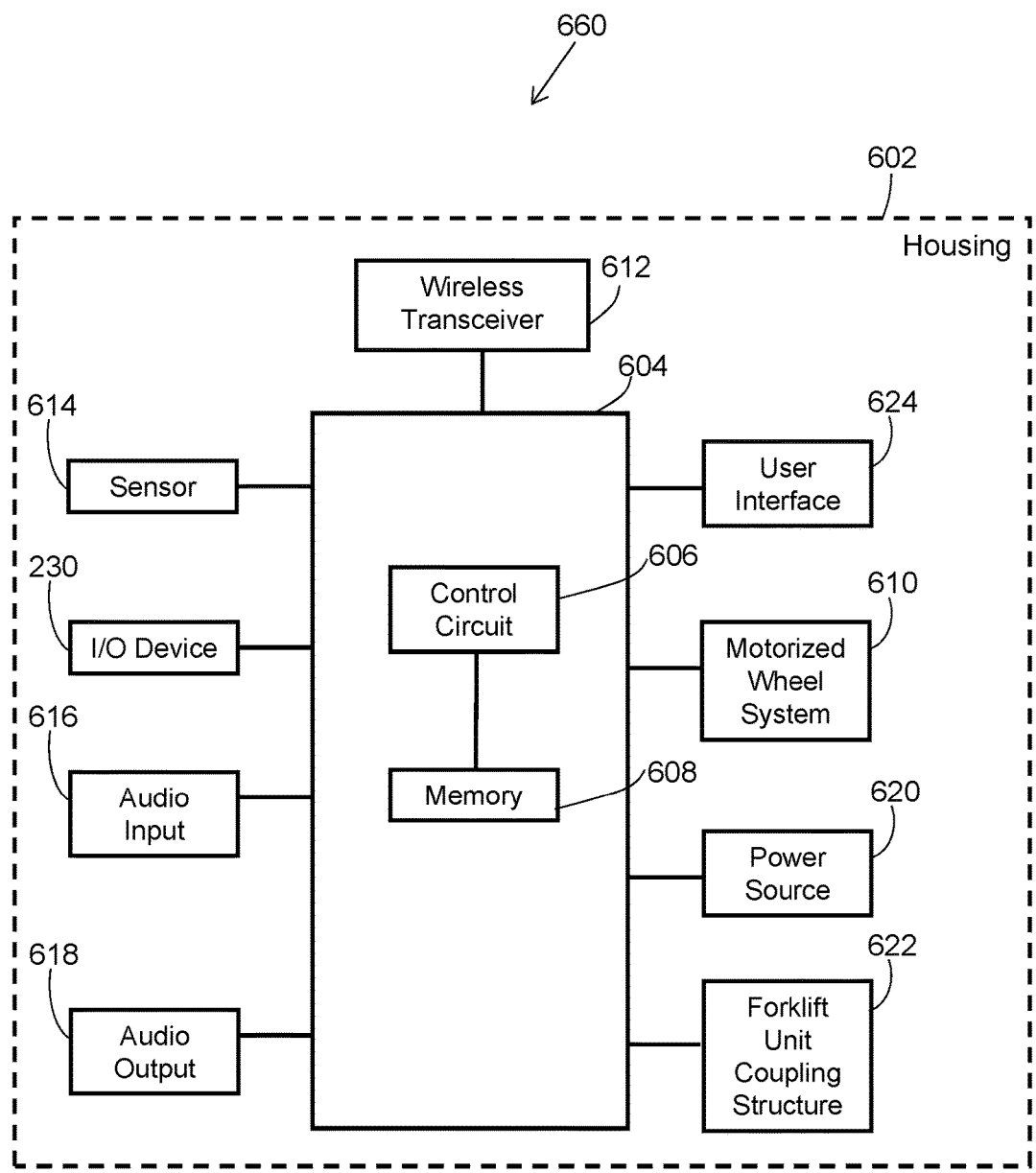
FIG. 6 comprises a block diagram of a motorized transport unit as configured in accordance with various embodiments of these teachings.

FIG. 6 presents a more detailed example of some embodiments of the motorized transport unit 160 of FIG. 1. In this example, the motorized transport unit 660 has a housing 602 that contains (partially or fully) or at least supports and carries a number of components. These components include a control unit 604 comprising a control circuit 606 that, like the control circuit 210 of the central computer system 140, controls the general operations of the motorized transport unit 660. Accordingly, the control unit 604 also includes a memory 608 coupled to the control circuit 606 and that stores, for example, operating instructions and/or useful data.

The control circuit 606 operably couples to a motorized wheel system 610. This motorized wheel system 610 functions as a locomotion system to permit the motorized transport unit 660 to move within the aforementioned product storage facility 110 (thus, the motorized wheel system 610 may more generically be referred to as a locomotion system). Generally, this motorized wheel system 610 will include at least one drive wheel (i.e., a wheel that rotates (around a horizontal axis) under power to thereby cause the motorized transport unit 660 to move through interaction with, for example, the floor of the product storage facility 110). Exemplary drive wheels 372 are shown in FIG. 3A. The motorized wheel system 610 can include any number of rotating wheels (three such wheels 372 are shown in FIG. 3A) and/or other floor-contacting mechanisms as may be desired and/or appropriate to the application setting. The motorized wheel system 660 may also include a steering mechanism of choice. One simple example may comprises one or more of the aforementioned wheels 372 that can swivel about a vertical axis to thereby cause the moving motorized transport unit 660 to turn as well. Various examples of motorized wheel systems are known in the art. Further elaboration in these regards is not provided here for the sake of brevity save to note that the aforementioned control circuit 606 is configured to control the various operating states of the motorized wheel system 610 to thereby control when and how the motorized wheel system 610 operates.

In the exemplary embodiment of FIG. 6, the control circuit 606 operably couples to at least one wireless transceiver 612 that operates according to any known wireless protocol. This wireless transceiver 612 can comprise, for example, a Wi-Fi-compatible and/or Bluetooth-compatible transceiver that can wirelessly communicate with the aforementioned central computer system 140 via the aforementioned network 150 of the product storage facility 110. So configured, the control circuit 606 of the motorized transport unit 660 can provide information to the central computer system 140 (via the network 150) and can receive information and/or movement instructions (instructions from the central computer system 140. For example, the control circuit 606 can receive instructions from the central computer system 140 via the network 150 regarding directional movement (e.g., specific predetermined routes of movement) of the motorized transport unit 660 when coupled to a forklift unit 170 and/or when not coupled to the forklift unit throughout the space of the product storage facility 110. These teachings will accommodate using any of a wide variety of wireless technologies as desired and/or as may be appropriate in a given application setting. These teachings will also accommodate employing two or more different wireless transceivers 612, if desired.

The control circuit 606 also couples to one or more on-board sensors 614. These teachings will accommodate a wide variety of sensor technologies and form factors. By one approach, at least one such sensor 614 can comprise a light sensor or light receiver. When the aforementioned location detection system 120 comprises a plurality of light emitters disposed at particular locations within the product storage facility 110, such a light sensor 614 can provide information that the control circuit 606 and/or the central computer system 140 employs to determine a present location and/or orientation of the motorized transport unit 660 within the space of the product storage facility 110.

As another example, such a sensor 614 can comprise a distance measurement unit configured to detect a distance between the motorized transport unit 660 and one or more objects or surfaces around the motorized transport unit 660 (such as an object that lies in a projected path of movement for the motorized transport unit 660 through the product storage facility 110). These teachings will accommodate any of a variety of distance measurement units including optical units and sound/ultrasound units. In one example, a sensor 614 comprises a laser distance sensor device capable of determining a distance to objects in proximity to the sensor. In some embodiments, a sensor 614 comprises an optical based scanning device to sense and read optical patterns in proximity to the sensor, such as bar codes variously located on structures in the product storage facility 110. In some embodiments, a sensor 614 comprises a radio frequency identification (RFID) tag reader capable of reading RFID tags in proximity to the sensor. Such sensors may be useful to determine proximity to nearby objects, avoid collisions, orient the motorized transport unit 660 at a proper alignment orientation to engage, for example, a forklift unit 170 and/or a pallet 180 or the like. The foregoing examples are intended to be illustrative and are not intended to convey an exhaustive listing of all possible sensors. Instead, it will be understood that these teachings will accommodate sensing any of a wide variety of circumstances or phenomena to support the operating functionality of the motorized transport unit 660 in a given application setting.

In some embodiments, motorized transport units 660 may detect objects along their path of travel using, for example, sensors mounted on motorized transport unit 660 and/or video cameras or other sensors/readers installed at the product storage facility 110, and/or sensors installed on the forklift unit 670, and/or via communications with the central computer system 140. In some embodiments, the motorized transport unit 660 may attempt to avoid obstacles, and if unable to avoid, it will notify the central computer system 140 of such a condition. In some embodiments, using sensors 614 (such as distance measurement units, e.g., laser or other optical-based distance measurement sensors), the motorized transport unit 660 detects obstacles in its path, and will move to avoid, or stop until the obstacle is clear.

By one optional approach, an audio input 616 (such as a microphone) and/or an audio output 618 (such as a speaker) can also operably couple to the control circuit 606. So configured, the control circuit 606 can provide a variety of audible sounds to thereby communicate with a user (e.g., a worker at the product storage facility 110) of the motorized transport unit 660 or other motorized transport units 660 in the area. These audible sounds can include any of a variety of tones and other non-verbal sounds. Such audible sounds can also include, in lieu of the foregoing or in combination therewith, pre-recorded or synthesized speech.

The audio input 616, in turn, provides a mechanism whereby, for example, a user (e.g., a worker at the product storage facility 110) provides verbal input to the control circuit 606. That verbal input can comprise, for example, instructions, inquiries, or information. So configured, a user can provide, for example, an instruction and/or query (e.g., where is pallet number 1000?) to the motorized transport unit 660. The control circuit 606 can cause that verbalized question to be transmitted to the central computer system 140 via the wireless transceiver 612 of the motorized transport unit 660. The central computer system 140 can process that verbal input to recognize the speech content and to then determine an appropriate response. Such a response might comprise, for example, transmitting back to the motorized transport unit 660 specific instructions regarding how to move (i.e., a specific route calculated by the central computer system 140) the motorized transport unit 660 (via the aforementioned motorized wheel system 610) to the location in the product storage facility 110 where pallet number 1000 is located.

In the embodiment illustrated in FIG. 6, the motorized transport unit 660 includes a rechargeable power source 620 such as one or more batteries. The power provided by the rechargeable power source 620 can be made available to whichever components of the motorized transport unit 660 require electrical energy. By one approach, the motorized transport unit 660 includes a plug or other electrically conductive interface that the control circuit 606 can utilize to automatically connect to an external source of electrical energy to thereby recharge the rechargeable power source 620.

By one approach, the motorized transport unit 660 comprises an integral part of the forklift unit 470 or 570. As used herein, this reference to "integral" will be understood to refer to a non-temporary combination and joinder that is sufficiently complete so as to consider the combined elements to be as one. Such a joinder can be facilitated in a number of ways including by securing the motorized transport unit housing 602 to the forklift unit 470 or 570 using bolts or other threaded fasteners as versus, for example, a clip.

These teachings will also accommodate selectively and temporarily attaching the motorized transport unit 660 to the forklift unit 470. In such a case, the motorized transport unit 660 can include a forklift coupling structure 622. By one approach this forklift coupling structure 622 operably couples to a control circuit 606 to thereby permit the latter to control the forklift unit 570 via communication between the control interface connection 567 of the motorized transport unit 560 and the forklift interface connection 577 of the forklift unit 570. So configured, by one approach, the control circuit 606 can automatically and selectively move the motorized transport unit 660 (via the motorized wheel system 610) towards a particular forklift unit 570 until the forklift coupling structure 622 (e.g., the control interface connection) of the motorized transport unit 660 can engage the forklift unit 570 (e.g., the forklift interface connection 577) to thereby temporarily physically couple the motorized transport unit 660 to the forklift unit 170. So coupled, the motorized transport unit 660 can then cause the forklift unit 170 to move with the motorized transport unit 660 as described above. In embodiment illustrated in FIG. 5, the coupling structure 622 includes a lifting system (e.g., including an electric drive or motor) to cause a portion of the body or housing 602 (e.g., the upper body portion 564) to engage and lift a portion of the forklift unit 570 (e.g., forks 574) such that the motorized transport unit 660 can control movement of the forklift unit 570 while supporting the forks 574 of the forklift unit 570. As described above, in some embodiments, the motorized transport unit 660 may couple to a portion of the forklift unit and cause the forks 574 to move up and down without directly contacting the forks 574 but by activating a motor configured to move the forks 574 up and down.

In some embodiments, the motorized transport unit 660 includes an input/output (I/O) device 624 that is coupled to the control circuit 606. The I/O device 624 allows an external device to couple to the control unit 604. The function and purpose of connecting devices will depend on the application. In some examples, devices connecting to the I/O device 624 may add functionality to the control unit 604, allow the exporting of data from the control unit 404, allow the diagnosing of the motorized transport unit 660, and so on.

In some embodiments, the motorized transport unit 660 includes a user interface 626 including for example, user inputs and/or user outputs or displays depending on the intended interaction with the user (e.g., worker at product storage facility 110). For example, user inputs could include any input device such as buttons, knobs, switches, touch sensitive surfaces or display screens, and so on. Example user outputs include lights, display screens, and so on. The user interface 626 may work together with or separate from any user interface implemented at an optional user interface unit (such as a smart phone or tablet device) usable by a worker at the product storage facility 110.

In some embodiments, the motorized transport unit 660 may be controlled by a user on-site, off-site, or anywhere in the world. This is due to the architecture of some embodiments where the central computer system 140 outputs the control signals to the motorized transport unit 160. These controls signals can originate at any electronic device in communication with the central computer system 140. For example, the movement signals sent to the motorized transport unit 660 may be movement instructions determined by the central computer system 140; commands received at a user interface unit from a user; and commands received at the central computer system 140 from a remote user not located at the product storage facility 110.

The control unit 604 includes a memory 608 coupled to the control circuit 606 and that stores, for example, operating instructions and/or useful data. The control circuit 606 can comprise a fixed-purpose hard-wired platform or can comprise a partially or wholly programmable platform. These architectural options are well known and understood in the art and require no further description here. This control circuit 606 is configured (for example, by using corresponding programming stored in the memory 608 as will be well understood by those skilled in the art) to carry out one or more of the steps, actions, and/or functions described herein. The memory 608 may be integral to the control circuit 606 or can be physically discrete (in whole or in part) from the control circuit 606 as desired. This memory 608 can also be local with respect to the control circuit 606 (where, for example, both share a common circuit board, chassis, power supply, and/or housing) or can be partially or wholly remote with respect to the control circuit 606. This memory 608 can serve, for example, to non-transitorily store the computer instructions that, when executed by the control circuit 606, cause the control circuit 606 to behave as described herein.

It is noted that not all components illustrated in FIG. 6 are included in all embodiments of the motorized transport unit 660. That is, some components may be optional depending on the implementation.

Figure 7:
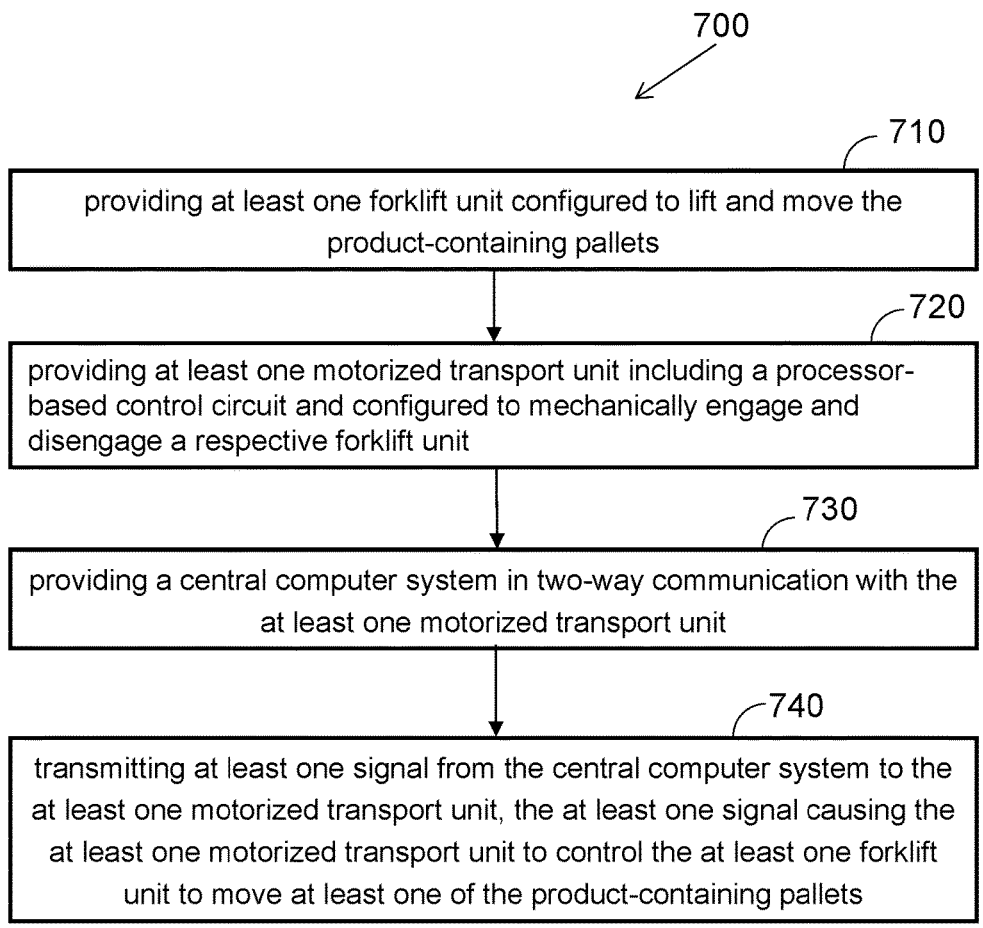
FIG. 7 is a flow diagram of a process of monitoring feature product inventory at a retail sales facility in accordance with some embodiments.

With reference to FIG. 7, one method 700 of operation of the system 100 for facilitating movement of product-containing pallets includes providing at least one forklift unit 170 configured to lift and move pallets 180 that contain products 190 (step 710). The method further includes providing at least one motorized transport unit 160 including a processor-based control circuit and configured to mechanically engage and disengage a respective forklift unit 170 (step 720). In addition, the method 700 further includes providing a central computer system 140 in two-way communication with the at least one motorized transport unit 160 (step 730) and transmitting at least one signal from the central computer system 140 to the at least one motorized transport unit 160 (step 740). As described above, the one or more signals transmitted from the central computer system 140 to the motorized transport unit 160 cause the one or more motorized transport units 160 to control the one or more forklift units 170 to move at least one of the product-containing pallets 180 around the space of the product storage facility 110.

In some embodiments, the database 130 is configured to store electronic data indicating a location and an orientation of the product-containing pallets 180 in a pallet storage space of the product storage facility 110 and electronic data indicating a location and an orientation of the motorized transport units 160 and/or forklift units 160 in the space of the product storage facility 110. To that end, the exemplary system 100 may include identifying labels on the pallets 180 and scanners positioned throughout the product storage facility 110 configured to scan such labels and permit the central computer system 140 to determine the location and orientation of the pallets 180. Similarly, the location detection system 120 of the exemplary system 100 of FIG. 1 permits that the motorized transport units 160 (or sensors and/or cameras mounted throughout the product storage facility 110) to transmit to the central computer system 140 (via the network 150) at least one signal including electronic data indicating a location and an orientation of the motorized transport units 160 in the space of the product storage facility 110, enabling the central computer system 140 to control movement of the motorized transport units 160 based at least on the electronic data stored in the database 130 indicating the location and the orientation of the product-containing pallets 180 and the electronic data indicating the location and the orientation of the motorized transport unit 160 and the forklifts 170 controlled by the motorized transport units 160.

In some embodiments, the central computer system 140 is configured to transmit (via the network 150) at least one signal to one or more motorized transport unit 160 to cause the motorized transport unit 160 to move along a route determined by the central computer system 140 to arrive underneath a forklift unit 170 determined by the central computer system 140, and to couple to the forklift unit 170 as described above. Then, based on signals received from the central computer system 140, the motorized transport unit 160, when coupled to the forklift unit 170, can move within the product storage facility 110 along a route predetermined by the central computer system 140 to arrive at a pallet 180 selected by the central computer system 140, move into a position where a portion of the forklift unit 170 (e.g., the forks) extends underneath a portion of the product-containing pallet 180, move the product-containing pallet 180 in an upward direction away from the floor via the forks of the forklift unit 170, move the product-containing pallet 180 on the forklift unit 170 from a first storage location to a second storage location (or to a pallet unloading location) at the product storage facility 110 along a route determined by the central computer system 140, and to move the pallet 180 in a downward direction to set down the pallet 180 at the second storage location at the product storage facility 110. As explained above, the motorized transport unit 160, when coupled to the forklift unit 170 can properly align the forks of the forklift unit 170 to pick up a pallet 180 because the central computer system 140 is in communication with the database 130, which stores the real time locations and orientations of the pallets 180, motorized transport units 160, and/or forklift units 170 at the product storage facility 110.

The systems and methods described herein advantageously provide for semi-automated or fully automated operation of a product storage facility, where forklift units are guided and operated by motorized transport units that are controlled by a central computer system that is guided by a location detection system. The central computer system communicates with a database that stores real-time data indicating the location and orientation of the motorized transport units, forklift units, and/or pallets at the product storage facility, and calculates optimized routes for the motorized transport units at the product storage facility. As such, the costs of operating a product storage facility are significantly reduced and the efficiency of operation of such a facility is significantly increased.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for facilitating movement of product-containing pallets, the system comprising:
at least one forklift unit configured to lift and move the product-containing pallets;
at least one motorized transport unit including a processor-based control circuit and configured to mechanically engage and disengage a respective forklift unit;
a central computer system in two-way communication with the at least one motorized transport unit, the central computer system being configured to transmit at least one signal to the at least one motorized transport unit, the at least one signal configured to cause the at least one motorized transport unit to control the at least one forklift unit to move at least one of the product-containing pallets.

2. The system of claim 1:
wherein the central computer system includes a database configured to store electronic data indicating a location and an orientation of the at least one of the product-containing pallets in a pallet storage space;
wherein the at least one motorized transport unit is configured to transmit to the central computer system at least one signal including electronic data indicating a location and an orientation of the motorized transport unit in the pallet storage space; and
wherein the central computer system is configured to control movement of the at least one motorized transport unit based at least on the electronic data indicating the location and the orientation of the at least one of the product-containing pallets and the electronic data indicating the location and the orientation of the motorized transport unit.

3. The system of claim 2, wherein the central computer system is configured to transmit to the at least one motorized transport unit at least one signal causing the at least one forklift unit to: move into a position where at least a portion of the at least one forklift unit extends underneath a portion of the product-containing pallet; lift the product-containing pallet; and move the product-containing pallet from a first storage location to a second storage location.

4. The system of claim 3, wherein the motorized transport unit is further configured to:
transmit to the central computer system, during movement of the product-containing pallet by the at least one forklift from the first storage location to the second storage location, at least one signal indicating a location and orientation of the at least one motorized transport unit; and
transmit to the central computer system at least one signal indicating a location and orientation of the product-containing pallet when in the second storage location.

5. The system of claim 1, wherein:
each of the forklift units includes a forklift interface connection;
each of the motorized transport units includes a control interface connection configured to couple to and decouple from the forklift interface connection of the respective forklift unit; and
wherein the motorized transport unit is configured to control the forklift unit via the control interface connection and the forklift interface connection.

6. The system of claim 1, wherein the central computer system is configured to control, via the at least one motorized transport unit, the at least one forklift unit to engage a portion of the at least one of the product-containing pallets and to move the at least one of the product-containing pallets in one of an upward direction and a downward direction.

7. The system of claim 1, further comprising:
providing a plurality of light sources positioned about a pallet storage space, each light source being configured to emit a light signal including a unique identifier of the light source;
providing the at least one motorized transport unit with at least one sensor configured to receive the light signal from at least one of the light sources; and
decoding the unique identifier of the at least one of the light sources to determine a location of the at least one motorized transport unit in the pallet storage space.

8. The system of claim 1, further comprising:
at least one beacon on the at least one motorized transport unit, the at least one beacon being configured to emit a locator signal including a unique identifier of the beacon; and
at least one beacon reader in a pallet storage space, the at least one beacon reader configured to receive the locator signal from the at least one beacon; and
wherein the central computer system is configured to decode the locator signal of the at least one beacon to determine a location of the at least one motorized transport unit in the pallet storage space.

9. The system of claim 1, further comprising:
at least one label on one of the at least one motorized transport unit and the at least one forklift unit, the at least one label including a unique identifier of the respective one of the at least one motorized transport unit and the at least one forklift unit;
at least one label reader in a pallet storage space, the at least one label reader configured to scan the at least one label to obtain the unique identifier of the respective one of the at least one motorized transport unit and the at least one forklift unit; and
wherein the central computer system is configured to determine a location of the at least one motorized transport unit in the pallet storage space based on the scan of the at least one label by the at least one label reader.

10. The system of claim 1, further comprising:
at least one label on at least one of the product-containing pallets, the at least one label including a unique identifier of the at least one of the product-containing pallets;

at least one label reader coupled to the motorized transport unit, the at least one label reader configured to scan the at least one label to obtain the unique identifier of the at least one of the product-containing pallet; and wherein the central computer system is configured to determine a location of the at least one of the product-containing pallet relative to the motorized transport unit based on the scan of the at least one label by the at least one label reader.

11. A method of facilitating movement of product-containing pallets, the method comprising:
providing at least one forklift unit configured to lift and move the product-containing pallets;
providing at least one motorized transport unit including a processor-based control circuit and configured to mechanically engage and disengage a respective forklift unit;
providing a central computer system in two-way communication with the at least one motorized transport unit; and
transmitting at least one signal from the central computer system to the at least one motorized transport unit, the at least one signal causing the at least one motorized transport unit to control the at least one forklift unit to move at least one of the product-containing pallets.

12. The method of claim 11, further comprising:
storing, at the central computer system, electronic data indicating a location and an orientation of the at least one of the product-containing pallets in a pallet storage space; and
receiving, at the central computer system, at least one signal from the at least one motorized transport unit, the at least one signal received at the server from the at least one motorized transport unit including electronic data indicating a location and an orientation of the motorized transport unit in the pallet storage space;
wherein the transmitting step further comprises controlling, by the central computer system, movement of the at least one motorized transport unit based at least on the electronic data indicating the location and the orientation of the at least one of the product-containing pallets and the electronic data indicating the location and the orientation of the motorized transport unit.

13. The method of claim 12, wherein the controlling step further comprises transmitting at least one signal from the central computer system to the at least one motorized transport unit, the at least one signal causing the at least one forklift unit to: move into a position where at least a portion of the at least one forklift unit extends underneath a portion of the product-containing pallet; lift the product-containing pallet; and move the product-containing pallet from a first storage location to a second storage location.

14. The method of claim 13, further comprising:
transmitting from the motorized transport unit to the central computer system, during movement of the product-containing pallet by the at least one forklift from the first storage location to the second storage location, at least one signal indicating a location and orientation of the at least one motorized transport unit; and
transmitting, from the motorized transport unit to the central computer system, at least one signal indicating a location and orientation of the product-containing pallet when in the second storage location.

15. The method of claim 11, further comprising:
providing each of the forklift units with a forklift interface connection;

providing each of the motorized transport units with a control interface connection configured to couple to and decouple from the forklift interface connection of the respective forklift unit; and
controlling, by the motorized transport unit, the forklift unit via the control interface connection and the forklift interface connection.

16. The method of claim 11, wherein the transmitting step further comprises controlling, via the at least one motorized transport unit, the at least one forklift unit to engage a portion of the at least one of the product-containing pallets and to move the at least one of the product-containing pallets in one of an upward direction and a downward direction.

17. The method of claim 11, further comprising:
providing a plurality of light sources positioned about a pallet storage space, each light source being configured to emit a light signal including a unique identifier of the light source;
providing the at least one motorized transport unit with at least one sensor configured to receive the light signal from at least one of the light sources; and
decoding the unique identifier of the at least one of the light sources to determine a location of the at least one motorized transport unit in the pallet storage space.

18. The method of claim 11, further comprising:
providing at least one beacon on the at least one motorized transport unit, the at least one beacon being configured to emit a locator signal including a unique identifier of the beacon; and
providing at least one beacon reader in a pallet storage space, the at least one beacon reader configured to receive the locator signal from the at least one beacon; and
decoding the locator signal of the at least one beacon to determine a location of the at least one motorized transport unit in the pallet storage space.

19. The method of claim 11, further comprising:
providing at least one label on one of the at least one motorized transport unit and the at least one forklift unit, the at least one label including a unique identifier of the respective one of the at least one motorized transport unit and the at least one forklift unit;
providing at least one label reader in a pallet storage space, the at least one label reader configured to scan the at least one label to obtain the unique identifier of the respective one of the at least one motorized transport unit and the at least one forklift unit; and
determining a location of the at least one motorized transport unit in the pallet storage space based on the scan of the at least one label by the at least one label reader.

20. The method of claim 11, further comprising:
providing at least one label on at least one of the product-containing pallets, the at least one label including a unique identifier of the at least one of the product-containing pallets;
providing at least one label reader coupled to the motorized transport unit, the at least one label reader configured to scan the at least one label to obtain the unique identifier of the at least one of the product-containing pallet; and
determining a location of the at least one of the product-containing pallet relative to the motorized transport unit based on the scan of the at least one label by the at least one label reader.

* * * * *